US007645195B2

(12) United States Patent
Hirota

(10) Patent No.: US 7,645,195 B2
(45) Date of Patent: Jan. 12, 2010

(54) GAME APPARATUS, GAME METHOD, AND GAME PROGRAM

(75) Inventor: Ryuhei Hirota, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 338 days.

(21) Appl. No.: 11/382,473

(22) Filed: May 9, 2006

(65) Prior Publication Data

US 2006/0205509 A1 Sep. 14, 2006

Related U.S. Application Data

(63) Continuation of application No. PCT/JP2004/016545, filed on Nov. 8, 2004.

(30) Foreign Application Priority Data

Nov. 10, 2003 (JP) .............................. 2003-380424

(51) Int. Cl.
*A63F 13/12* (2006.01)
(52) U.S. Cl. .............................. 463/42; 463/29; 463/40; 273/461; 709/225; 709/111; 709/112
(58) Field of Classification Search .................. 463/29, 463/16, 1, 9–13, 20, 25, 40–42; 273/121 B, 273/145 R, 147, 141 A, 454–456, 460–461; 725/46; 705/14, 26, 35, 36 R, 37, 42, 77; 902/10, 23; 709/203–207, 217–219, 225, 709/FOR. 106, FOR. 115, FOR. 122, FOR. 130, 709/FOR. 131, FOR. 132, FOR. 141, FOR. 148, 709/FOR. 149, FOR. 153, FOR. 111, FOR. 112; 340/7.1, 7.2, 7.21, 7.28, 311.1, 311.2, 426.21, 340/572, 825.29, 825.44; 715/744, 758; 704/E15.047
See application file for complete search history.

(56) References Cited

U.S. PATENT DOCUMENTS

| 5,428,528 | A | * | 6/1995 | Takenouchi et al. ........... 463/42 |
| 5,775,996 | A | * | 7/1998 | Othmer et al. ................ 463/40 |
| 5,816,920 | A | | 10/1998 | Hanai |
| 5,820,463 | A | * | 10/1998 | O'Callaghan ................ 463/42 |
| 6,152,824 | A | * | 11/2000 | Rothschild et al. ............ 463/42 |
| 6,306,039 | B1 | | 10/2001 | Kaji et al. |
| 6,309,301 | B1 | | 10/2001 | Sano |
| 6,342,665 | B1 | | 1/2002 | Okita et al. |
| 6,346,048 | B1 | * | 2/2002 | Ogawa et al. ................ 463/40 |
| 6,554,712 | B1 | * | 4/2003 | Takahashi .................... 463/43 |
| 6,641,481 | B1 | * | 11/2003 | Mai et al. ..................... 463/42 |
| 6,865,371 | B2 | * | 3/2005 | Salonidis et al. ........... 455/41.1 |

(Continued)

FOREIGN PATENT DOCUMENTS

EP 1 239 628 A2 9/2002

(Continued)

*Primary Examiner*—Peter DungBa Vo
*Assistant Examiner*—Arthur O. Hall
(74) *Attorney, Agent, or Firm*—Global IP Counselors, LLP

(57) ABSTRACT

The present invention serves to prevent inequity among game arcades by effectively using the communication band of a communication line in a game arcade in which a game device for an online game is located. When a game device in a location A and a game device in a location B play an online game via an external network, the master terminal device is determined based on the master priorities Mp of both devices. The master priority is calculated in accordance with the status of each location. A formula for calculating the master priority is set so as to balance the number of master terminal devices with the number of client terminal devices in a location, and/or so as to effectively use the communication band of a communication line in a location.

9 Claims, 15 Drawing Sheets

U.S. PATENT DOCUMENTS

| | | | |
|---|---|---|---|
| 6,954,800 B2* | 10/2005 | Mallory | 709/240 |
| 7,288,028 B2* | 10/2007 | Rodriquez et al. | 463/42 |
| 7,490,126 B2* | 2/2009 | Ozzie et al. | 709/205 |
| 2002/0086732 A1* | 7/2002 | Kirmse et al. | 463/42 |
| 2002/0115488 A1* | 8/2002 | Berry et al. | 463/42 |
| 2002/0128065 A1* | 9/2002 | Chung et al. | 463/42 |
| 2002/0129169 A1* | 9/2002 | Tanaka et al. | 709/248 |
| 2002/0132656 A1* | 9/2002 | Lydon et al. | 463/9 |
| 2002/0142842 A1* | 10/2002 | Easley et al. | 463/42 |
| 2002/0155879 A1* | 10/2002 | Walker et al. | 463/20 |
| 2002/0165024 A1* | 11/2002 | Puskala | 463/40 |
| 2002/0173349 A1* | 11/2002 | Ach, III | 463/1 |
| 2003/0190960 A1* | 10/2003 | Jokipii et al. | 463/42 |
| 2004/0111483 A1* | 6/2004 | Watanabe | 709/207 |
| 2004/0139159 A1* | 7/2004 | Ricciardi et al. | 709/205 |

FOREIGN PATENT DOCUMENTS

| | | |
|---|---|---|
| JP | 7/80152 A | 3/1995 |
| JP | 7/88250 A | 4/1995 |
| JP | 2000/157748 | 6/2000 |
| JP | 2001/149658 | 6/2001 |
| JP | 2004/174091 | 6/2004 |
| JP | 2004/350910 A | 12/2004 |

* cited by examiner

Input from lever (up, down, right and left)
Input from buttons (five buttons)

Fig. 3A

Player data for 22 players (positions, directions, movements)
Position and direction of ball
Info. of referee (positions, directions, movements)
Info. of cameras (directions, movements)
Number of the player on which cursor is positioned
Points, Time

Fig. 3B

Remaining physical strength of 22 players
Number of yellow cards and red cards of players
Number of shots so far
Number of fouls so far
Points
Names of teams
Player data

*Fig. 12*

GAME APPARATUS, GAME METHOD, AND GAME PROGRAM

CROSS-REFERENCE TO RELATED APPLICATIONS

This application is a continuation application of International Application No. PCT/JP2004/016545 filed on Nov. 8, 2004. The entire disclosure of U.S. Patent Application No. PCT/JP2004/016545 is hereby incorporated herein by reference.

This application also claims priority to Japanese Patent Application No. 2003-380424. The entire disclosure of Japanese Patent Application No. 2003-380424 is hereby incorporated herein by reference.

BACKGROUND OF THE INVENTION

Field of the Invention

The present invention relates to online games which can be played against one another by game devices connected via a network.

Background InformationOnline games played with game devices located at a location, such as an arcade game located at a game arcade, have been recently proposed. Usually, in an online game, one of the game devices operated by the players will become the master, and the other game devices will become slaves. The master terminal device manages the progress of the game. The slave terminal devices output images and other data as the game progresses.

More specifically, the master terminal device: 1) receives operation commands that are input by one of the players; 2) receives command data from the slave terminal devices that was input to the slave terminal devices by other players; 3) manages the progress of the game based on the commands input at the master terminal device and the commands input from the slave terminal devices; 4) controls the screen output and the audio output at the master terminal device based on the progress of the game; and 5) transmits output data indicating the progress of the game to the slave terminal devices. On the other hand, the slave terminal devices 1) receive operation commands that are input by the players; 2) transmit the commands input by the players as command data to the master terminal device; 3) receive the data output from the master terminal device; and 4) control screen output and audio output based on the received output data.

Problems to be Solved

As discussed previously, the master terminal device transmits output data indicating the progress of the game to the slave terminal devices, and the slave terminal devices receive the output data from the master terminal device. Therefore, the master terminal device requires a broader communication band in the communication line used for transmission than that for reception. On the other hand, the slave terminal devices require a broader communication band in the communication line used for reception than that for transmission.

However, the communication band used for transmission at game arcades is not generally the same as that used for reception. The communication band used for reception is usually set to be broader than that for transmission in order to prevent packet loss due to an insufficient communication ban0d for reception.

In addition, the communication band at game arcades generally differs from one game arcade to another. In one game arcade, the communication band for transmission may be 4 Mbps, and the communication band for reception may be 6 Mbps. In another game arcade, the communication band for transmission may be 1 Mbps, and the communication band for reception may be only 300 Kbps.

Meanwhile, when there are a plurality of game devices in one game arcade, the ratio between master terminal devices and slave terminal devices will not stay constant, but rather change according to the situation. Too many master terminal devices in one game arcade may create a shortage in the communication band for transmission and a surplus in the communication band for reception. On the contrary, too many slave terminal devices in one game arcade may create a surplus in the communication band for transmission and a shortage in the communication band for reception. As online arcade games increase in popularity, there will be a need to prevent the above-mentioned situation from occurring, and to effectively use the communication bands in the game arcade.

Further, a situation may frequently occur in which a game arcade S1 has many master terminals, and another game arcade S2 has many slave terminals. However, this situation creates inequity between the game arcade S1 and the game arcade S2, because a player at a master terminal device can play the game with an advantage. There is a strong tendency, especially in highly active games, to give the player at the master terminal device an advantage. So when an online game becomes more popular, it can be anticipated that the game arcade S1 with many master terminal devices will attract more players because of the advantage, and the game arcade S2 will attract less players.

An object of the present invention is to realize a smooth online game by effectively using the communication band of a communication line in a game arcade where the online game is located.

Another object of the present invention is to prevent the creation of inequity between game arcades where online games are located.

SUMMARY OF THE INVENTION

In order to solve the above-described problems, a first aspect of the present invention provides a game device which is connected to a first internal network in a first location, which receives a communication address of another game device at least connected to a second internal network in a second location via an external network and sets the communication address as a communication address of an opponent, and which executes an online game. The game device comprises:

calculation means for calculating, based on the status of the first location, a first master priority Mp1 that represents a priority for becoming a master terminal device which manages the progress of the online game;

transmission means for transmitting the first master priority Mp1 to the opponent via the external network;

receiving means for receiving a second master priority Mp2 that represents a priority of the other game device for becoming a master terminal device via the external network; and determination means for comparing the first master priority Mp1 with the second master priority Mp2 and determining which is to become a master terminal device or a slave terminal device based on the comparison result.

This game device executes an online game as the master terminal device or as one of the slave terminal devices when connected to other game device(s) via the network. The master terminal device manages the progress of the online game.

The slave terminal device performs display processing based on data transmitted from the master terminal device and transmits command data input by a player(s) to the master terminal device. Whether or not a terminal device becomes the master terminal device is determined based on the master priority.

More specifically, the game device compares the master priorities Mp of one or more opponents with its master priority Mp, and determines the terminal device having the highest master priority Mp to be the master terminal device. The master priority Mp is calculated based on the communication band of a communication line connecting a LAN in a location and an external network, and based on the ratio of the number of master terminal devices to slave terminal devices. By determining the master terminal device based on the master priority Mp, the communication band in a location can be used effectively, and the game devices in a location can be prevented from disproportionately becoming a master terminal device or slave terminal device.

A second aspect of the present invention provides the game device according to the first aspect, and further comprises determined result transmission means for transmitting the result determined by the determination means, and determined result receiving means for receiving the determination result on whether to become a master terminal device or a slave terminal device from the other game device over the first internal network. The calculation means calculates the first master priority Mp1 based on the status of the first location, including the number of master terminal devices and the number of slave terminal devices in the first location, when the determined result receiving means receives the determination result transmitted from the other game device connected to the first internal network.

For example, a game device placed in a certain location can calculate the master priority Mp based on the following formula (1).

$$Mp = Ns - Nm \quad (1)$$

Here, Nm: present number of master terminal devices in a location

Ns: present number of slave terminal devices in a location

The determination results which the determined result receiving means has received from the determined result transmission means of other game devices will allow one to identify the number of master terminal devices Nm and slave terminal devices Ns in a location. In accordance with formula (1), a larger Nm reduces the master priority Mp, and a larger Ns increases the master priority Mp. Therefore, a game device placed in a location can be prevented from becoming only a master terminal device or only a slave terminal device. In other words, a balance between the number of master terminal devices and the number of slave terminal devices in a location can be maintained, and equity between locations can be secured.

A third aspect of the present invention provides the game device according to the first or second aspects, wherein the calculation means calculates the first master priority Mp1 based on the status of the first location, including the communication band of a communication line connected between the first internal network in the first location and the external network, the communication band of the communication line assigned to a master terminal device, and the communication band of the communication line assigned to a slave terminal device.

For example, a game device set in one location can calculate the master priority Mp based on the following formula (2).

$$Mp = Lm - Ls \quad (2)$$

Here, Lm: remaining communication band of a communication line in a location when the game device itself becomes the master terminal device Ls: remaining communication band of a communication line in a location when the game device itself becomes a slave terminal device The communication band of the communication line in a location connects a internal network such as a LAN and the like with an external network. According to formula (2), the master priority Mp becomes larger when becoming the master terminal device provides more space for the communication band in the location compared to becoming a slave terminal device. In the reverse case, the master priority Mp becomes smaller. The master priority Mp calculated by the above formula provides an effective use of the communication band in each location.

A fourth aspect of the present invention provides the game device according to any one of the first, second and third aspects, and further comprises first experience value storage means for storing a game experience value of a player based on the number of times the player has played the online game at a master terminal device and the number of times the player has played the online game at a slave terminal device, and first update means for updating the game experience value. In this game device, the calculation means calculates the first master priority Mp1 based on the game experience value located in the first experience value storage means in addition to the status of the location. The first update means updates the game experience value by adding a predetermined value to the game experience value according to the determination of the determination means.

The game experience value indicates how many times a player been on a master terminal device and a slave terminal device in his/her past games. For example, "1" is added to the game experience value when the player is on a master terminal device, and "−1" is added to the game experience value when the player is on a slave terminal device. The master priority Mp, for example, can be calculated based on the following formula (3) with the use of the latest game experience value of the player which is calculated as mentioned above.

$$Mp = (Ns - Nm) \times n + E \quad (3)$$

Here, n: positive number which is sufficiently larger than E

E: game experience value of a player

Nm: present number of master terminal devices in a location

Ns: present number of slave terminal devices in a location

For example, the use of the above formula (3) can distinguish between the master priority Mp2 of an opponent and the master priority Mp1 of the game device itself, even if they are the same according to formula (1). Further, the use of formula (3) can prevent a feeling of inequity for players. For example, it can prevent a player from playing games only with a master terminal device, or only with a slave terminal device.

A fifth aspect of the present invention provides the game device according to any one of the first, second, and third aspects, and further comprises second experience value storage means for storing a game number, which is the number of times the player has played the online game, and a master time, which is the number of times the player has played the online game at a master terminal device, and second update means for updating the game number and the master number. In this game device, the calculation means calculates the first master priority Mp1 based on the status of the location, in addition to the ratio of the master number to the game number. The second update means updates the game number by increasing the game number, and updates the master number by increasing the master number according to the determination of the determination means.

For example, by replacing the game experience value with (master number)/(game number) in the above formula (3), the master priority can be calculated. This can mitigate the effect which a difference in the game numbers will have on the master priority Mp, even when the master priorities of the players who have different experience numbers are compared.

A sixth aspect of the present invention provides the game device according to any one of the first aspect to the fifth aspect, and comprises first communication band monitoring means for determining whether or not to exceed the communication band of the first location connected to the external network when becoming a master terminal device or a slave terminal device. The first communication band monitoring means is set to turn on a master ban flag when the communication band is exceeded when becoming a master terminal device and, and is set to turn on a slave ban flag when the communication band is exceeded when becoming a slave terminal device. The first communication band monitoring means further comprises flag transmission means for transmitting a flag set by the first communication band monitoring means, and flag receiving means for receiving a flag transmitted from the other game device via the external network. The determination means determines whether to become a master terminal device or a slave terminal device based on the flag set by the first communication band monitoring means, and the flag received by the flag receiving means, in response to a comparison of the first master priority $Mp1$ with the second master priority $Mp2$.

For example, when the slave ban flag of the opponent is on, and the master ban flag of the game device itself is on, the opponent is determined to be the master terminal device despite the comparison result of their master priorities. When the slave ban flags or the master ban flags (hereinafter, simply referred to as a ban flag) are competing against one another, it is determined that (1) the opponent is not connected to other opponent(s), (2) the master terminal device is determined based on their master priorities, and the like. By determining the master terminal device in reference to the ban flag, it becomes easier to prevent the communication band in the location from being exceeded.

A seventh aspect of the present invention provides the game device according to any one of the first aspect to the fifth aspect, and further comprises second communication band monitoring means and change request transmission means. The second communication band monitoring means determines whether or not the determination of the determination means will lead to excessive usage of the communication band in the first location connected to the external network. The change request transmission means is for transmitting a change request message which requests at least one of the other game devices in the first location to change from a master terminal device to a slave terminal device, or change from a slave terminal device to a master terminal device via the first internal network, when there will be excessive usage of the communication band of the first location and when a plurality of game devices are connected to the first internal network.

For example, the process of a game device T1 when the game device T1 in a first location and a game device T2 in a second location are to play a game against each other will be described. It is assumed that the game device T1 is the master terminal device, and the game device T2 is a slave terminal device, based on a comparison between the master priority $Mp1$ of the game device T1 and the master priority $Mp2$ of the opponent T2. However, when the communication band in the first location is exceeded because the game device T1 becomes the master terminal device, the change request transmission means of the game device T1 will transmits to one or more other game devices in the first location a change request message which requests for a change from a master terminal device to a slave terminal device via the first internal network.

An eighth aspect of the present invention provides the game device according to any one of the first aspect to the seventh aspect, wherein the determination means determines which game device will become a master terminal device or a slave terminal device based on an identifier which identifies each game device over the first internal network and the second internal network, when the first master priority $Mp1$ and the second master priority $Mp2$ compete against each other.

The identifier refers to, for example, an IP address or a unique device number of each device. When the master priority $Mp1$ of the game device T1 in the first location and the master priority $Mp2$ of the game device T2 in the second location are competing, the master terminal device may be determined according to their IP addresses. The competition between the master priorities $Mp1$ and $Mp2$ may include not only the case where both master priorities are totally the same, but also the case where the difference between them is below a predetermined value.

A ninth aspect of the present invention provides the game device according to the first aspect, and further comprises opponent determination means and candidate determination means. When the game device itself is a master candidate, it will be determined whether the game device becomes a master terminal device or one of the slave terminal devices. The opponent determination means determines whether or not any remaining game device in the first location is further included as an opponent in addition to a game device in the second location. The candidate determination means determines which of the game devices will become a candidate for a master terminal device or a candidate for a slave terminal device in the first location, based on predetermined master candidate determination data, when an opponent plays the game in the first location.

The present invention can be applied to the case in which some opponents play a game in the first location. For example, a case will be described where the game devices T1 and T2 in the first location, and a game device T3 in the second location, play the game against one another. Any of the game devices T1, T2, and T3 will become the master terminal device. However, it makes no difference which of the game devices T1 or T2 will become the master terminal device. Therefore, two cases may be broadly considered. One case is where the master terminal device is assigned to the first location, and the other case is where the master terminal device is assigned to the second location. To which location the master terminal device will be assigned depends on the master priorities of both locations. If it is assigned to the first location, it is preliminarily determined which of the game device T1 or T2 will become the master candidate. In short, the master candidate is preliminarily determined. For example, a game device with the highest IP address such as the game device T1 is determined to be the master candidate. The master candidate T1 calculates the master priority, assuming that the opponent T2 in the first location is a slave terminal device. In addition, the master candidate T1 determines the master terminal device by comparing its master priority with that of the opponent T3 in the second location. In other words, which of the game terminal device T1 or the opponent terminal device T3 will become the master terminal device is determined based on both of the master priorities. Further, the game device T1 notifies the opponent terminal device T2 in the first location of the determination that it will become the master terminal device. Unless it is notified, the game device T2 does not know which of the opponents has became the master terminal device. This makes it possible to determine the master terminal device by using the master priority, even if there are a plurality of game devices in the first location which participate in the game.

A tenth aspect of the present invention provides a game method executed by a game device which is connected to a first internal network in a first location, the game device receiving a communication address of another game device at least connected to a second internal network in a second location via an external network, and setting the communication address as a communication address of an opponent, in order to execute an online game. The method comprises the following steps:

calculating a first master priority Mp1 that represents the priority for becoming a master terminal device which manages the progress of the online game, based on the status of the first location;

transmitting the first master priority Mp1 to the opponent via the external network;

receiving a second master priority Mp2 that represents the priority of the other game device for becoming a master terminal device via the external network; and comparing the first master priority Mp1 with the second master priority Mp2 to determine which will become a master terminal device or a slave terminal device based on the comparison result.

This method is executed by the game system according to the first aspect of the present invention, and has similar functions and effects as the first aspect.

An eleventh aspect of the present invention provides a game program that operates a computer as a game device which plays a competitive network game which is connected to a first internal network in a first location, receives a communication address of another game device connected at least to a second internal network in a second location via an external network as a communication address of an opponent, and executes an online game. The game program causes the computer to function as:

calculation means for calculating a first master priority Mp1 that represents the priority for becoming a master terminal device which manages the progress of the online game, based on the status of the first location;

transmission means for transmitting the first master priority Mp1 to the opponent via the external network;

receiving means for receiving a second master priority Mp2 that represents the priority of the other game device for becoming a master terminal device via the external network; and determination means for comparing the first master priority Mp1 with the second master priority Mp2 and determining which will become a master terminal device or a slave terminal device based on the comparison result.

This program operates the game computer as the game device according to the first aspect of the present invention, and has similar functions and effects as the first aspects.

According to the present invention, it is possible to maintain equity among locations where an online game is played, and to effectively use the communication band in a location where the online game is played.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

FIG. 3A shows an example of input data to be transmitted from the slave terminal devices to the master terminal device.

FIG. 3B shows an example of output data to be transmitted from the master terminal device to the slave terminal devices.

FIG. 12 shows an example of game data to be transmitted to the next master terminal device when the master terminal device is switched.

PREFERRED EMBODIMENTS OF THE PRESENT INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

OVERVIEW OF THE PRESENT INVENTION

When a game device in a location A and a game device in a location B play the online game via an external network, the master terminal device is determined based on the master priorities Mp of both devices. A master priority Mp indicates the priority that the game device itself becomes the master terminal device which manages the progress of the game. The method can be applied to a case where at least one of the opponents in a game is in a different location. In addition, it can be applied not only to an online game played one-to-one but also to an online game played by three or more players.

The master priority is calculated according to the status of each location. A formula for calculating the master priority is set so as to balance the number of master terminal devices with that of slave terminal devices in a location, and/or so as to effectively use the communication band of a communication line in a location. For example, the master priority is calculated based on the number of master terminal devices and that of slave terminal devices in each location. In addition, for example, the master priority is calculated based on the remaining communication band of a communication line connecting an internal network in a location and an external network.

Embodiment 1

In this embodiment, an example will be illustrated in which a game device Ta and a game device Tb which are set in a location A and a location B respectively play the online game against each other. These two game devices calculate master priority Mpa and Mpb respectively, and notify each other of their own master priority Mp. Each game device compares its master priority with that of the opponent, and determines a game device which has a higher priority to be the master terminal device. Then, each game device starts the game according to its own role.

Structure

Figure 1:
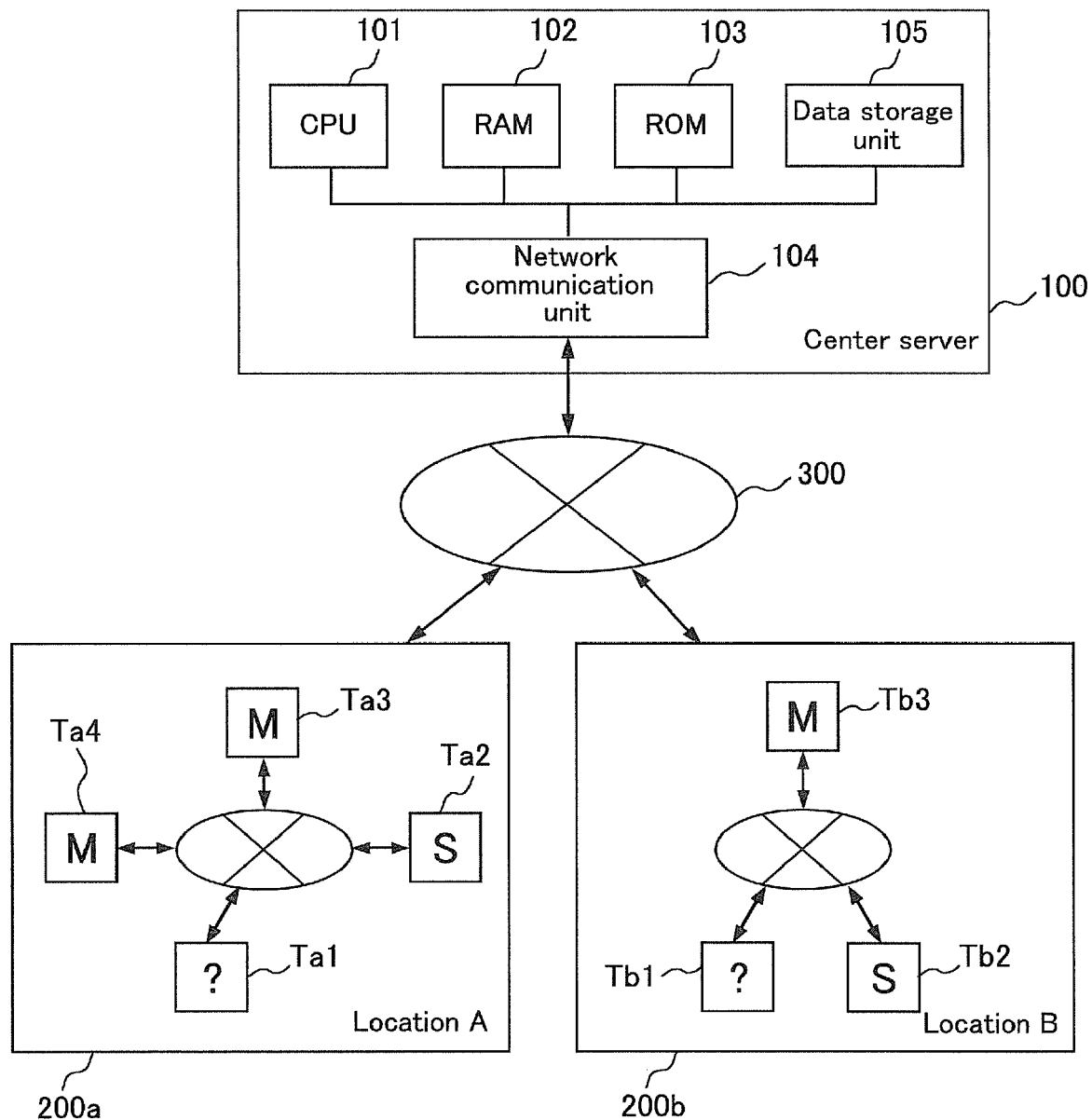
FIG. 1 is an illustrative diagram showing a schematic structure of a game system according to Embodiment 1.

FIG. 1 is an illustrative diagram showing a schematic structure of a game system including the game device according to Embodiment 1 of the present invention. The game system includes a center sever 100 and a plurality of locations 200*a*, 200*b*... A plurality of game devices T are set in each location. The game devices T set in the same location are connected to one another by an internal network 301, for example, a LAN (Local Area Network). Further, the LAN 301 in each location is connected to an external network 300 such as the Internet via a communication line in a location (not shown in FIG. 1). The center server 100, in addition to each location, is connected to the external network 300. In FIG. 1, the game devices in the location 200*a* are shown as game devices Ta, and game devices in the location 200*b* are shown as game devices Tb. In addition, a game device which performs as the master terminal is shown as "M", and a game device which performs as the slave terminal device is shown as "S". Further, a game device which is to start the online game and whose role as the master terminal device or the slave terminal device has not yet determined is shown as "?".

(1) Center Server

The center server 100 stores personal data for each of the players, and upon a request from the game device T, transmits the personal data to the game device that requested it. As shown in FIG. 1, the center server 100 includes the following elements (a) through (e).

(a) CPU 101: Reads out and runs a control program stored in a ROM 103 which will be explained below.

(b) RAM 102: Temporarily stores personal data and the like such as data which a player sets up when playing a game and data based on past battle record, which is different from each game.

(c) ROM 103: Stores the control program, personal data, and the like.

(d) Network communication unit 104: Transmits and receives data to and from the game device T via the network 300.

(e) Data storage unit 105: Stores personal data transmitted from the game device T.

(2) Game Device

Figure 2:
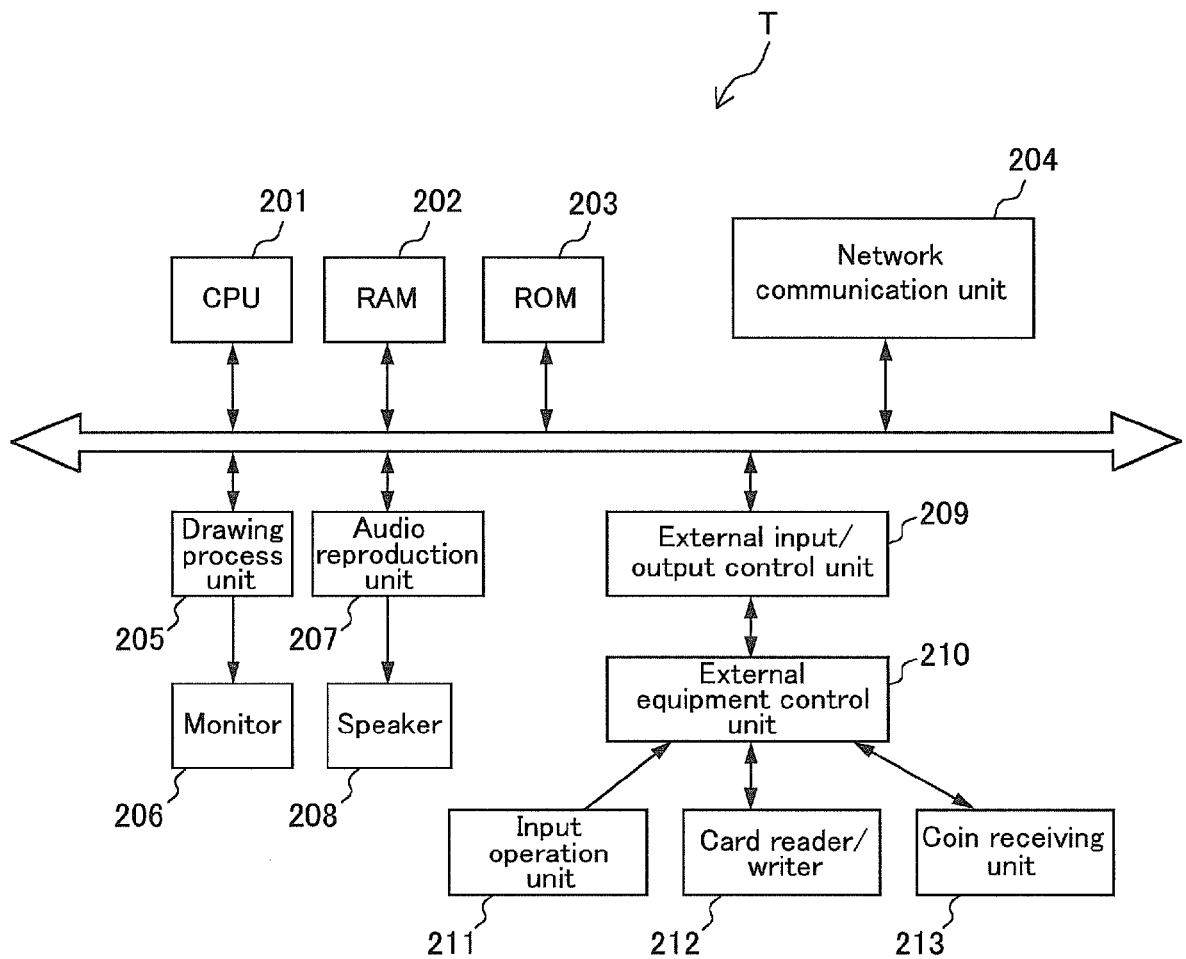
FIG. 2 is an illustrative diagram showing the structure of a game device T.

FIG. 2 shows the structure of the game device T. The game device T plays the game with the other game device T via the network 300 based on personal data obtained from the center server 100. The game deice T includes the following elements (a) through (m).

(a) CPU 201: Runs a control program stored in a ROM 203 which will be explained below.

(b) RAM 202: Temporarily stores a variety of variables, parameters and the like.

(c) ROM 203: Stores a control program, a variety of parameters, and the like.

(d) Network communication unit 204: Transmits and receives data to and from the center server 100 and other game device T via the network 300 and the LAN 301.

(e) Monitor 206: Displays game video.

(f) Drawing process unit 205: Generates video data to be displayed on the monitor 206.

(g) Speaker 208: Outputs sound while game is being played or a demonstration screen is being displayed.

(h) Audio reproduction unit 207: Generates sound data to be produced by the speaker 208.

(i) Input operation unit 211: Includes a joystick, operation buttons and/or the like, and receives commands from a player.

(j) Card reader/writer 212: Reads/writes data on a magnetic card that has been inserted therein.

(k) Coin receiving unit 213: Receives credit(s) by inserting coin(s) therein.

(l) External equipment control unit 210: Controls external equipment such as an operation unit, the card reader/writer 212, the coin receiving unit 213, and the like.

(m) External input/output control unit 209: Generates control signals to external equipment such as card reader/writer 212, the coin receiving unit 213, and the like. Also receives detection signals from the external equipment and sends those signals to the CPU 201.

With the game device T having the above-described structure, the game is played as follows according to the control program stored in the ROM 203. A player inserts his/her magnetic card into the card reader/writer 212, and inserts coin(s) into the coin receiving unit 213 at the game device T. The game device T reads a player ID, identifies a player from the magnetic card inserted to the card reader/writer 212, and downloads personal data stored in the data storage unit 105 of the center server 100. Then, when a player desires to play the online game, the game device T transmits its network address to the center server 100 and obtains the network address of an opponent. Further, a master priority is calculated based on the status of the location 200 at the time and transmitted to the opponent. After comparison of the master priority of the game device itself with that of the opponent, the master terminal device is determined based on the comparison result. Then, the game is started according to the role of each game device. A method for calculating the master priority will be explained below in detail.

When the game device itself becomes a slave terminal device, it transmits personal data downloaded from the center server 100 to the opponent to be the master terminal device. Then, it transmits input data indicating operation commands of the player to the master terminal device. The input data is transmitted every time the operation commands are generated. In addition, the slave terminal device receives the output data from the master terminal device, and outputs video data and sound data based on the received data. FIG. 3A shows an example of the input data to be transmitted from the slave terminal devices to the master terminal device. This example shows the input data in a soccer game. The input data represents which of the up, down, left and right levers is operated and which of five buttons is pressed.

When the game device itself becomes the master terminal device, the game is started based on the personal data of all the game devices T which participate in the game (hereinafter, simply referred to as all the game devices T). The personal data differs according to the type of game. In a soccer game, the personal data may include a name of a team, a name of a team member, and the like. After the game is started, the master terminal device receives the input data from the slave terminal device and conducts the game based on the input data. Further, the master terminal device creates output data according to the progress of the game and transmits it to the slave terminal device. It is preferable if the output data is transmitted at certain intervals according to types of data. FIG. 3B shows an example of the output data to be transmitted from the master terminal device to the slave terminal device. The output data is sound data for inputting frame data and sound to display a game screen at the slave terminal device. In this example, an example of the output data in a soccer game is shown. The master terminal device transmits various types of output data to the slave terminal device at certain intervals according to types of the data. For example, the frame data is transmitted every 1/60 seconds.

Method for Calculating a Master Priority

To determine which of the game devices T playing the game will become the master terminal device, a control program stored in the ROM 203 will calculate the master priority Mp of each game device itself. The method for calculating the master priority Mp is not particularly limited. However, the master priority Mp is determined at least based on the status of the location. The situation of the location refers to 1) the master terminal device number Nm in a location and the slave terminal device number Ns, and/or 2) the communication band of the communication line in the location connecting the LAN 301 and the external network 300. Accordingly, it is preferable if the master priority Mp is calculated so as to balance Nm with Ns in the location. It is also preferable if the master priority Mp is calculated so as to effectively use the communication band of the communication line in the location connecting the LAN 301 and the external network 300. Hereinafter, the method for calculating the master priority Mp will be explained with some examples.

(1) Method of Calculation 1

According to the first method of calculation, a first master priority Mp 1 is calculated based on the master terminal device number Nm and the number of slave terminal devices Ns in each location. For example, with a game device T which is set in a certain location 200, the master priority Mp can be calculated based on the following formula (1).

$$Mp=Ns-Nm \quad (1)$$

Here, Nm: present number of master terminal devices in the location

Ns: present number of slave terminal devices in the location

According to formula (1), a larger master terminal device number Nm makes the master priority Mp a smaller negative value, and a larger number of slave terminal devices Ns makes the master priority Mp larger. When both devices are balanced, the master priority Mp becomes close to zero. Therefore, this can prevent the case where there are only master terminal devices in the location, or there are only slave terminal devices. In other words, this makes it possible to maintain a balance between the number of master terminal devices and that of slave terminal devices in the location.

(2) Method of Calculation 2

According to the second method of calculation, the master priority Mp is calculated based on the communication band S of a communication line in the location connecting the LAN 301 and the external network 300, the communication band of a communication line assigned to the master terminal device, and the communication band of a communication line assigned to a slave terminal device. For example, with a game device T which is set in a certain location 200, the master priority Mp can be calculated based on the following formula (2).

$$Mp=Lm-Ls \quad (2)$$

Here, Lm: remaining communication band of a communication line in the location when the game device itself becomes the master terminal device Ls: remaining communication band of a communication line in the location when the game device itself becomes the slave terminal device The communication band of the communication line in the location means the one connecting the LAN 301 and the external network 300. According to formula (2), the master priority Mp becomes larger when becoming the master terminal device provides more space for the communication band S in the location compared to becoming the slave terminal device. In the reverse case, the master priority Mp becomes negative. Therefore, the communication band S in the location 200 can be used effectively.

More particularly, the communication band S connecting the LAN 301 in the location and the external network 300 includes an up band Su and a down band Sd. The up band Su is a transmission communication band for transmitting data to the external network 300. The down band Sd is a receiving communication band for receiving data from the external network 300. Therefore, each of Lm and Ls is the sum of the remaining up band Su and remaining down band Sd. In other words, the following formula is formed regarding Lm and Ls.

$$Lm=Lum+Ldm \quad (2\text{-}1)$$

$$Ls=Lus+Lds \quad (2\text{-}2)$$

Here, Lum: remaining up band Su in the location when the game device itself becomes the master terminal device Ldm: remaining down band Sd in the location when the game device itself becomes the master terminal device Lus: remaining up band Su in the location when the game device itself becomes the slave terminal device Lds: remaining up band Sd in the location when the game device itself becomes the slave terminal device In addition, the negative value of Lum, which is the remaining up band Su, and the negative value of Ldm, which is the remaining down Sd, mean that the communication band is exceeded.

(3 Method of Calculation 3

According to the third method of calculation, the up band and the down band may be considered separately. For example, as a modification of the above formula (2), the master priority Mp may be calculated according to the following formula (2-3).

$$Mp=(Lum-Lus)\times n+(Ldm-Lds)\times m \quad (2\text{-}3)$$

Herein, n, m: counting number

In other words, if the game device becomes the master terminal device, and Lum and Ldm, which are the remainder of the up band Su and the down band Sd, respectively, in the location 200, are large, the master priority Mp becomes larger. On the other hand, if the game device becomes the slave terminal device, and Lus and Lds, which are the remainder of the up band Su and the down band Sd, respectively, in the location 200, are large, the master priority Mp becomes negative. "n" and "m" are the weights of the up band and the down band. The weights may be set in consideration of the magnitude of the up band Su and the down band Sd of the communication band in the location.

One reason for considering the down band and the up band separately as described above is that the up band Su and the down band Sd are usually set so that Sd is larger than Su (Su<Sd), which aims to reliably receive data transmitted over the external network 300. The other reason is that the up band of the master terminal device is usually larger than that of the down band, and the up band of the slave terminal device is usually smaller than that of the down band.

For example, each communication band is set as follows.
Up band of the master terminal device: 80 kbps
Down band of master terminal device: 20 kbps
Up band of slave terminal device: 20 kbps
Down band of slave terminal device: 80 kbps Therefore, the master terminal device uses more up band Su in the location in comparison with the slave terminal device. On the contrary, the slave terminal device uses more down band Sd in comparison with the master terminal device. According to the use of the above formula (2-3), the master priority Mp can be calculated in consideration of the difference between the up band Su and down band Sd, and the difference of the consumption of the up band and the down band between the master terminal device and the slave terminal device.

(4) Method of Calculation 4

According to the second method of calculation, the master priority Mp can be calculated based on a ratio of the remaining communication band in the location to the communication band. For example, the master priority Mp may be calculated by using the following formula (2-4) as a modification of the above formula (2-3), considering the up band and down band separately.

$$Mp=(Lum/Su-Lus/Su)\times n+(Ldm/Sd-Lds/Sd)\times m \tag{2-4}$$

Herein, n, m : counting number

The up band Su and the down band Sd usually differ from location to location. Therefore, even if a value of Lum is the same as that of Ldm, this does not mean the spaces of the communication bands are substantially the same. By calculating the master priority Mp based on the ratio of the up band Su and the down band Sd, the master priorities Mp can be equitably compared, even if there is a difference in the communication bands between the locations.

According to the use of the formula (2-4), the master priority Mp becomes larger if the game device becomes the master terminal device, and this provides a larger ratio of the remaining Lum/Su and Ldm/Sd, which are the up band and the down band in the location. On the contrary, the master terminal device becomes negative if the game device becomes the slave terminal device, and this provides a larger ratio of the remaining Lum/Su and Ldm/Sd. "n", and "m" are weights of the up band and the down band. The weights may be set in consideration of the magnitudes of the up band Su and the down band Sd of a communication band in a location.

(5) Method of Calculation 5

According to the fifth method of calculation, a master experience value E as well as the status of the location is reflected in the master priority Mp. The master experience value E represents a value indicating how many times the player has had the experience of being on a master terminal device in his/her past games. Every time the player plays the game with a master terminal device or a slave terminal device, the master experience value E is updated. The master experience value E will be explained below in detail. Then, before the game is started, the master priority Mp is calculated based on the latest master experience value of the player. For example, the master priority Mp can be calculated according to the following formula (3).

$$Mp=(Ns-Nm)\times n+E \tag{3}$$

Herein, n: positive number which is larger than E
E: master experience value of a player In accordance with the use of the above formula (3), the master priorities can be differentiated even if only the master terminal device number Nm and the slave terminal device number Ns can not make a distinction between the master priorities. In addition, by combining the master terminal value E, and the above formula (2), formula (2-3), and formula (2-4), the master priorities can be differentiated even when there is no difference between the spaces of communication band. Further, there are some advantages of being able to prevent inequity between players, such as the case where the player has only experienced playing with the master terminal device or only experienced playing with the slave terminal device.

Master Experience Value

The master experience value E used for the above calculation method 5 is included in the personal data of the player, or can be calculated based on the personal data of the player.

EXAMPLE 1

$$Enew=Eold+X \ldots \text{ in the case of a master terminal device} \tag{4-1}$$

$$Enew=Eold-X \ldots \text{ in the case of a slave terminal device} \tag{4-2}$$

Herein, Enew: latest master experience value
Eold: latest but one master experience value
X: predetermined value For example, when the player plays the game with the master terminal device, the game device adds a predetermined value, for example, "+1" to the master experience value of the player (referred to as a game experience value). On the other hand, when the game device becomes a slave terminal device, it adds a predetermined value, for example, "−1" to the master experience value. The master experience value calculated like this becomes larger as the player has much more experience of being on a master terminal device than being on a slave terminal device. On the contrary, it becomes negative as the player has much more experience of being on a slave terminal device than being on a master terminal device. When the opportunity to become a master terminal device and the opportunity to become a slave terminal device is balanced, the value is close to zero.

EXAMPLE 2

$$Enew \text{ (master number)/(game number)} \tag{5}$$

At a predetermined timing, for example, at the end of the game, the game device T updates a game number which is the number of times the player operating the game device itself has played the game. In addition, the game device T increments the master number of the player when the game device itself becomes the master terminal device. The master number is the number of times that the player has played the game as the master terminal device, which is set to a default value of "zero". Based on the latest game number and the latest value of the master terminal device calculated like this, the master experience value Enew is calculated. Even if the master experience values of the players who have different numbers of experience of playing the game are compared, it can mitigate the effect which the difference in the game number has on the master priority Mp.

Ban Flag

The control program executed by the game device T can determine the master terminal device as well as the master priority Mp, using a ban flag (communication band monitoring means). The game device T determines the master terminal device as follows. First, when the game device T becomes the master terminal device, it determines whether or not the up band Su and the down band Sd at the location 200 are exceeded. When at least one of them is exceeded, it turns on a master ban flag. Likewise, when the game device T becomes the slave terminal device, it determines whether or not the up band Su and the down band Sd at the location 200 are exceeded. When at least one of them is exceeded, it turns on a slave ban flag. The game device T transmits and receives the values of the slave ban flag and the master ban flag as well as the master priority Mp to and from the opponent.

The game device T determines the master terminal device based on the slave ban flag and the master ban flag for the game device T itself and the opponent, instead of their master priorities Mp or in addition to their master priorities Mp. Specifically, it is preferable to give preference to the slave ban flag or master ban flag (hereinafter, sometimes collectively referred to as the ban flag) over the master priority. For example, when the slave ban flag of the opponent is ON, and the slave ban flag of the game device itself is OFF, the opponent is determined to be the master terminal device irrespective of the comparison result of the master priorities. In the case where the game device that will start the game is determined based only on the ban flag if the ban flag is transmitted and received prior to calculation of the master priority, there is an advantage in that the master priority does not need to be calculated. When the ban flags are competing, this can be addressed by 1) not connecting the opponent with other opponent(s), 2) determining either of them to be the master terminal device based on the master priorities, or the like. When all the ban flags of game devices playing against one another are OFF, the role of each device may be determined based on the master priority. By determining the master terminal device in reference to the ban flag, it becomes easier to prevent the communication band of the communication line in the location from being exceeded.

Process at Game Device

Next, the process performed by the game device T will be described in more detail. In order to simplify the explanation, the following game will be played with the game device Ta1 in the location 200a and the game device Tb1 in the location 200b, and a ban flag will not be used. Because the process performed by the game device Ta1 is the same as that performed by the game device Tb1, the process performed by the gamed device Ta1 will be described below. In addition, an example will be described in which the master priority is calculated based on the master terminal device number Nm and the slave terminal device number Ns in a location, and the master experience value E (the above formula (3)). The master experience value E will be updated by adding a predetermined value based on whether or not a game device will become the master terminal device (the above formulas (4-1) and (4-2)).

(1) Main Routine

Figure 4:
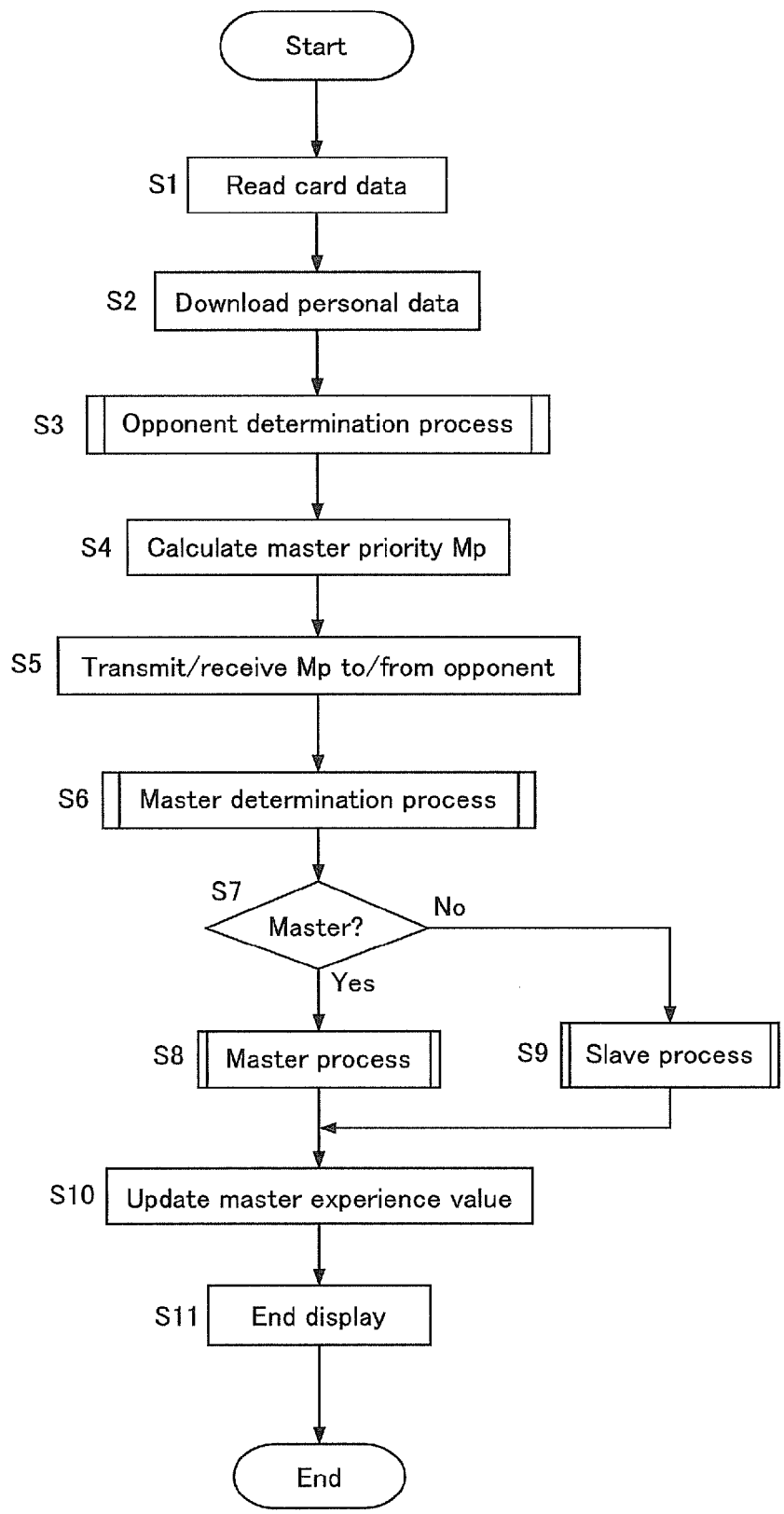
FIG. 4 is a flow diagram showing an example of the flow of the main routine performed by the game device.

FIG. 4 is a flow diagram showing an example of a flow of the main routine performed by the CPU 201 of the game device Ta1. The game device Ta1 plays the game with a master process if it is the master terminal device, and plays the game with a slave process if it is the slave terminal device.

Step S1: The CUP 201 obtains a player ID which is read by the card reader/writer 212.

Step S2: The CPU 201 transmits the player ID to the center server 100, and downloads personal data in accordance with the player ID. In this process, it is preferable to request the player to enter a password and to verify the identity of the player based on the password.

Step S3: The CPU 201 performs an opponent determination process which will be described later, and obtains an IP address of the game device Tb1 of the opponent which it plays against via the network 300.

Step S4: The CPU 201 calculates a master priority Mpa of the game device Ta1 itself based on the present master terminal device number Nm, the present slave terminal device number Ns in the location, and the master experience value E of the player (calculation means). Before calculating the master priority, the CPU 201 transmits an inquiry about a role of the game device Ta2 in the same location 200a, and collects a response during a predetermined time (determination result transmission means, and determination result receiving means). The response to this inquiry includes data indicating what each game device has become, i.e., the master terminal device or the slave terminal device. The CPU 201 calculates the present master terminal device number Nm and the present slave terminal device number Ns based on the collected response(s). The master experience value E is included in personal data (first experience value storage means).

Step S5: The CPU 201 transmits the master priority Mpa of the game device Ta1 itself to the opponent Tb1 (transmission means), and also receives the master priority Mpb of the opponent Tb1 (receiving means).

Step S6: The CPU 201 determines which of the game devices will become the master terminal device, and which of them will become the slave terminal device, based on a master determination process which will be described later (determination means).

Step S7: The CPU 201 determines whether or not the game device itself becomes the master terminal device in the game to be played based on the master determination process.

Step S8: The CPU 201 performs the master process when it becomes the master terminal device in the game to be played. In this process, the CPU 201 plays the game as the master terminal device, and transmits a game end notification to the slave terminal device when the game is finished.

Step S9: The CPU 201 executes the game in the slave process, which will be described later, when it determines that the game device itself is not the master terminal device. In other words, it transmits input data indicating a player's command to the master terminal device, and controls output based on output data which is received from the master terminal device until the game is finished.

Step S10: The CPU 201 updates the master experience value of the player (first update means).

Step S11: The CPU 201 displays the game outcome, uploads the personal data to the center server 100, and the like, when the game is finished.

Irrespective of the main routine, when the CPU 201 receives the inquiry about its role from a game device T in the first location during game execution, it perform a response process in which it tells the game device T what game device it is, i.e., the master terminal device or the slave terminal device (not shown).

In addition, when the master priority Mp is calculated based on the communication band in the location 200, the CPU 201 stores in the ROM 203 and the like the up band and the down band which each of the master terminal device and slave terminal device uses, and the communication bands Su and Sd in the location 200.

(2) Opponent Determination Process

Figure 5:
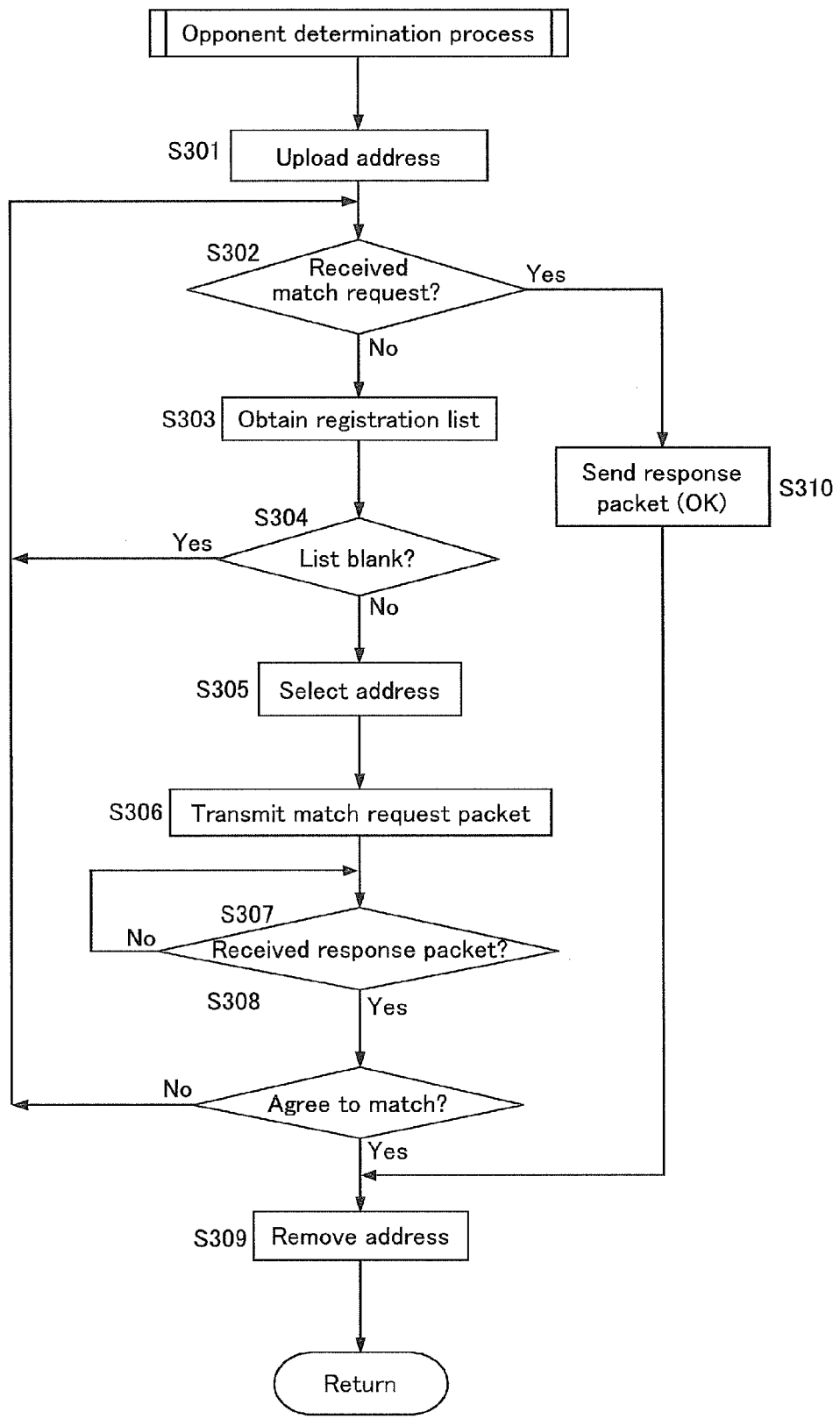
FIG. 5 is a flow diagram showing an example of the flow of an opponent determination process.

FIG. 5 is a flow diagram showing an example of the flow of an opponent determination process which is performed at Step S3 in the above mentioned main routine. In this process, the CPU 201 obtains the IP address of the opponent terminal device via the center server 100.

Step S301: The CPU 201 transmits its IP address to the center server 100 and requests the registration of the IP address to a registration list stored in the RAM 202 of the center server 100.

Steps S302 and 303: The CPU 201 determines whether or not it has received a match request from other game device T (S302). If it has not, it obtains a registration list from the center server 100 (S303). If it has received a match request, it proceeds to Step S310 which will be described later.

Steps S304 and S305: The CPU 201 determines whether or not an IP addressees) other than its address is registered on the registration list (S304). If it determines "Yes", it selects one of the IP addresses (S305).

Step S306: The CPU 201 transmits a match request packet describing a match request command to the selected IP address.

Steps S307 through S309: The CPU 201 waits for reception of a response packet to the transmitted match request packet (S307). When it receives a response which agrees to match (5308), it requests the center server 100 to remove its IP address from the registration list (S309). When the match is refused (S308), the CPU 201 returns to Step S302, and repeats the above-described process.

Step S310: When the CPU 201 receives the match request after it has registered its IP address to the registration list (S302), it transmits a response packet to the requester which agrees to match (S310), and requires the removal its IP address from the registration list (S309).

(3) Master Determination Process

Figure 6:
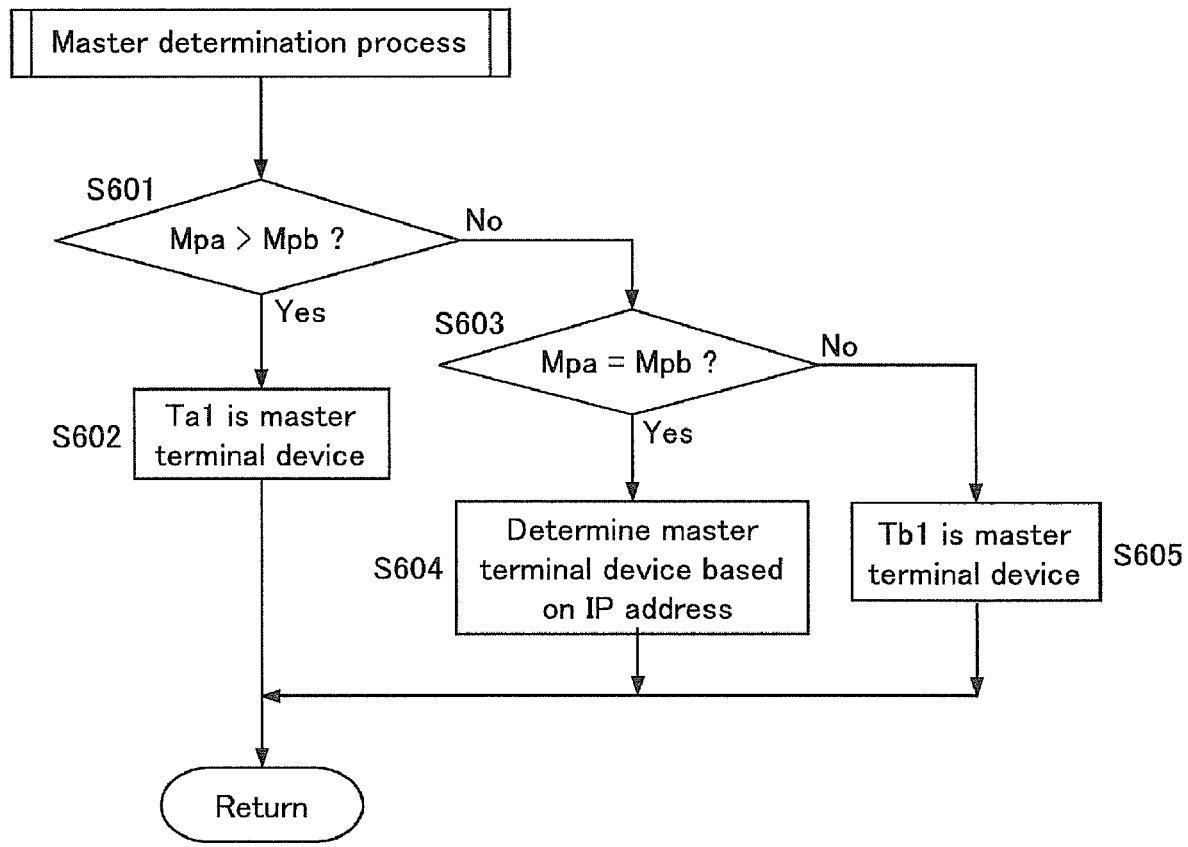
FIG. 6 is a flow diagram showing an example of the flow of a master determination process.

FIG. 6 is a flow diagram showing an example of the flow of the master determination process which is performed by the CPU 201 at Step S6 in the above mentioned main routine. In this process, the CPU 201 determines which of the game devices becomes the master terminal based on the comparison result between the master priority Mpa of the game device itself and the master priority Mpb of the opponent.

Steps S601 and S602: The CPU 201 compares the master priority Mpa of the game device itself with the master priority Mpb of the opponent (S601). If the master priority Mpa of the game device itself is larger than the master priority Mpb of the opponent (Mpa>Mpb), it determines that the master terminal device is the game device Ta1 itself (S602).

Steps S603 and S604: The CPU 201 determines whether or not the master priority Mpa of the game device itself is the same as the master priority Mpb of the opponent (S603). If they are the same (Mpa=Mpb), it determines the master terminal device based on both of the IP addresses (S604). For example, a game device with a larger IP address is determined to be the master terminal device.

Step S605: In the other case, i.e., the case of Mpa<Mpb, the CPU 201 determines that the master terminal device is the opponent Tb1.

(4) Master Process

Figure 7:
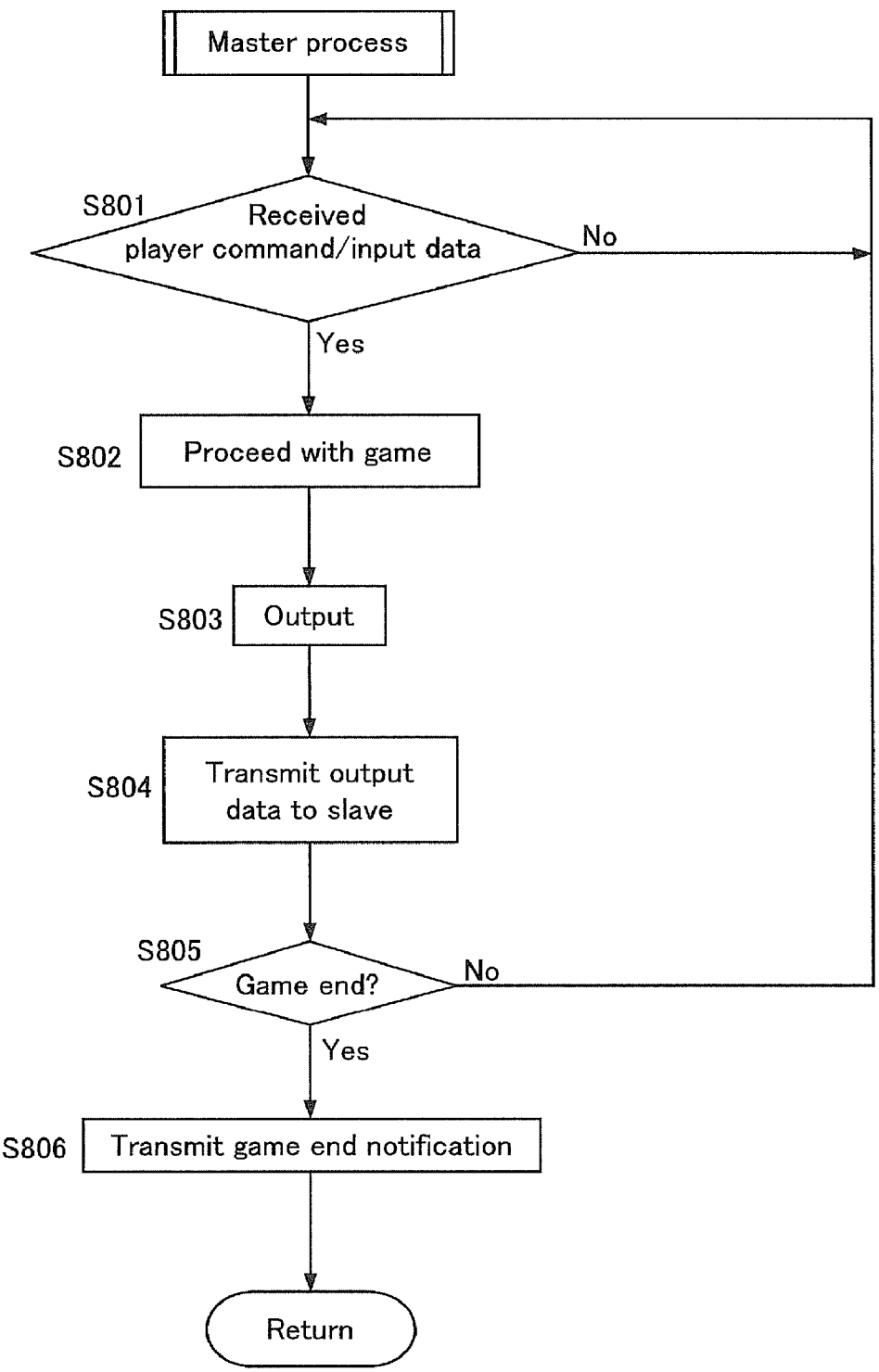
FIG. 7 is a flow diagram showing an example of the flow of a master process.

FIG. 7 is a flow diagram showing an example of the flow of the master process performed by the CPU 201 at Step S8 in the above-mentioned main routine. In this process, the CPU 201 executes the game as the master terminal device. In other words, the game device Ta1 plays the game as the master terminal device against a slave terminal device Tb1 that is the opponent.

Step S801: The CPU 201 waits for commands input by the player at the game device Ta itself or reception of input data from the slave terminal device Tb1. If there is any, it proceeds to Step S802.

Step S802: The CPU 201 executes the game based on the input data.

Step S803: The CPU 201 transmits output data to its drawing process unit 205 and audio reproduction unit 207, and controls the output.

Step S804: The CPU 201 transmits output data to the slave terminal device Tb1 of the opponent via the network 300.

Steps S805 and S806: The CPU 201 determines whether or not the game progress comes to an end (S805). When the game is finished (S805), the CPU 201 transmits a game end notification to all slave terminal devices, in this case to the game device Tb1 (S806). The game end notification includes data which is necessary for the slave terminal device Tb1 to perform a game end process. When it determines that the game has not come to an end, it returns to Step S801 again and repeats the above-mentioned process until the end of the game.

(5) Slave Process

Figure 8:
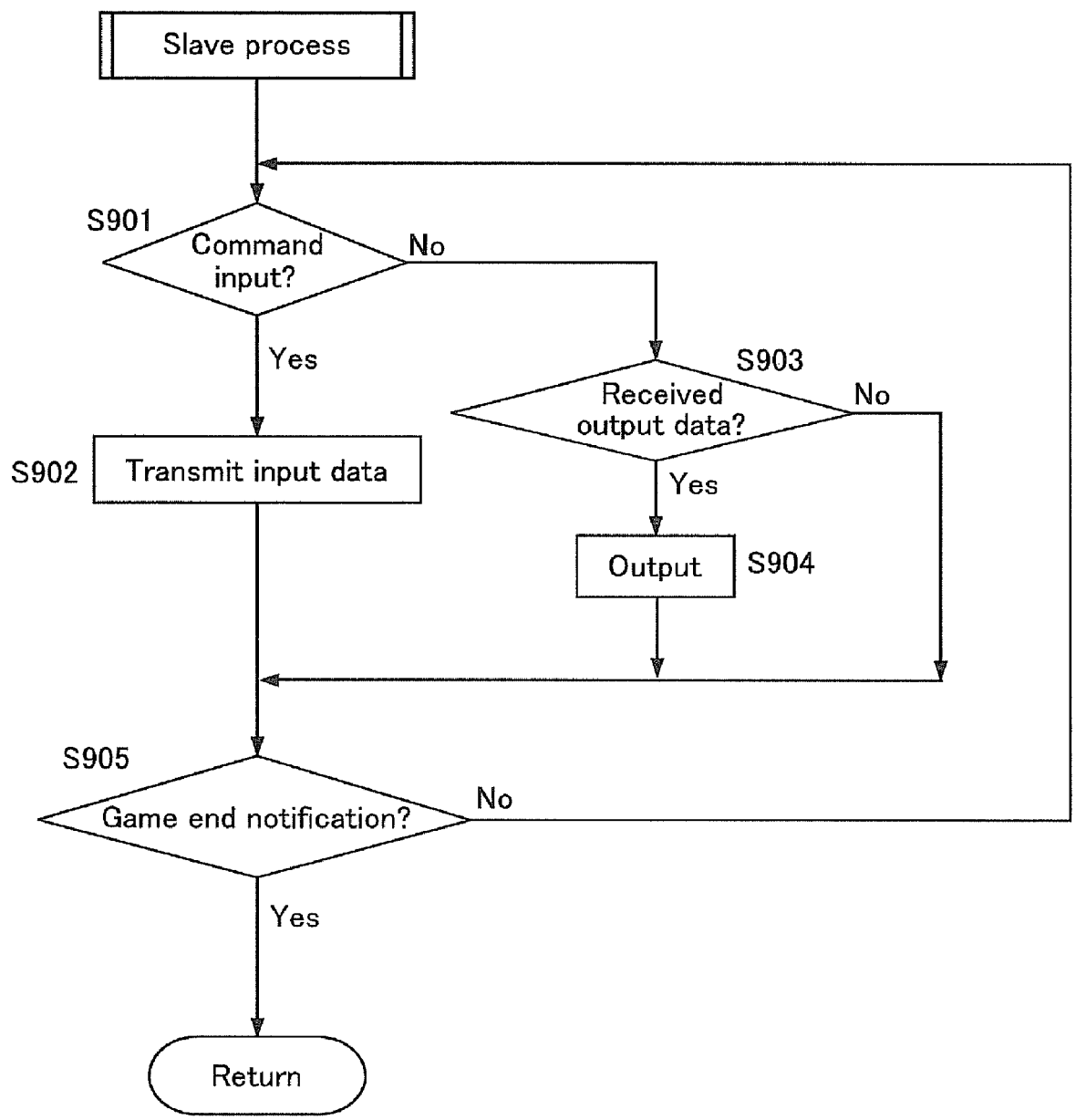
FIG. 8 is a flow diagram showing an example of the flow of a slave process.

FIG. 8 is a flow diagram showing an example of the flow of the slave process performed by the CPU 201 at Step S9 in the above-mentioned main routine. In this process, the CPU 201 executes the game as the slave terminal device. In other words, the game device Ta1 plays the game as the slave terminal device against the master terminal device Tb being the opponent.

Steps S901 and S902: The CPU201 waits for commands input from the player (S901), and transmits the input data to the master terminal device Tb1 every time it receives the commands input (S902).

Steps S903 and S904: The CPU 201 waits for reception of output data from the master terminal device Tb1 (S903), and transmits the received data to the drawing process unit 205 and/or audio reproduction unit 207 to control screen output and/or audio output (S904).

Step S905: The CPU 201 determines whether or not it has received the game end the main routine. When it has received it, it returns to the main routine.

Process of the Center Server

Figure 9:
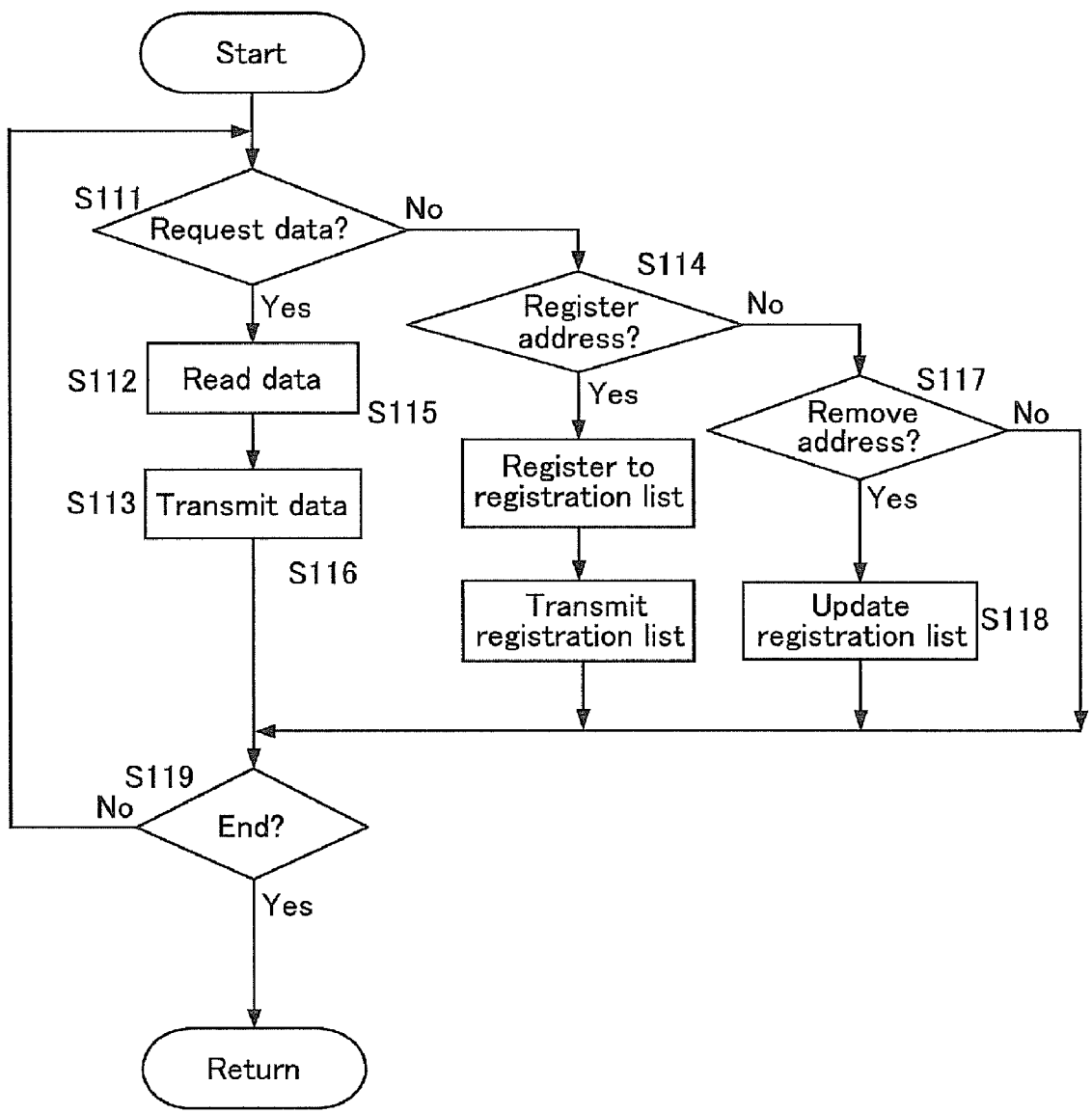
FIG. 9 is a flow diagram showing an example of the flow of the process performed by a center server.

FIG. 9 is a flow diagram showing an example of the flow of the process performed by the center server 100. The CPU 101 of the center server 100 performs a process of transmission of personal data to the game device T (S111 through S113), registration of the registration list (S114 through S116), and cancellation from the registration list (S117 and S118).

Steps S111 through S113: When the CPU 101 receives a request for personal data from any of the game devices T and performs person authentication based on a password (S111), it reads out personal data requested by the ROM 103 (S112)

and transmits it to requester (S113). The personal data is stored in the ROM 103 in association with the player IP and the password.

Steps S114 through S116: When the CPU 101 receives a registration request of an IP address to the registration list from any of the game devices T (S114), it registers the IP address of the game device in the registration list (S115), and transmits the registration list to the requester (S116).

Steps S117 and S118: When the CPU 101 receives a cancellation request for an IP address from the registration list from any of the game devices T, it removes the IP address from the registration list (S118). In order to ensure that only the IP addresses of game devices which do not have opponents yet are on the registration list, the IP addresses of game devices which have already opponents are removed from the registration list.

Step S119: The CPU 101 repeats the above-mentioned processes until the power of the center server 100 is tuned off, for example.

By calculating the master priority Mp in accordance with the above-mentioned formulas (1) and (3) based on the master terminal device number and slave terminal device number in the location, it is possible to prevent the game devices in the location from disproportionately being a master terminal device or slave terminal device. By calculating the master priority Mp in accordance with the above-mentioned formula (2) based on the communication band in the location, it is possible to effectively use the up band Su and the down band Sd in the location. In addition, it is possible to prevent the communication band in the location from being exceeded by using the ban flag.

Embodiment 2

The game device according to Embodiment 2 determines its own role based on the master priority, and then determines whether or not the communication band in the location is exceeded based on the determination of the role. As a result, when the communication band is exceeded, it transmits a role change request to other game device(s) in the same location.

Figure 10:
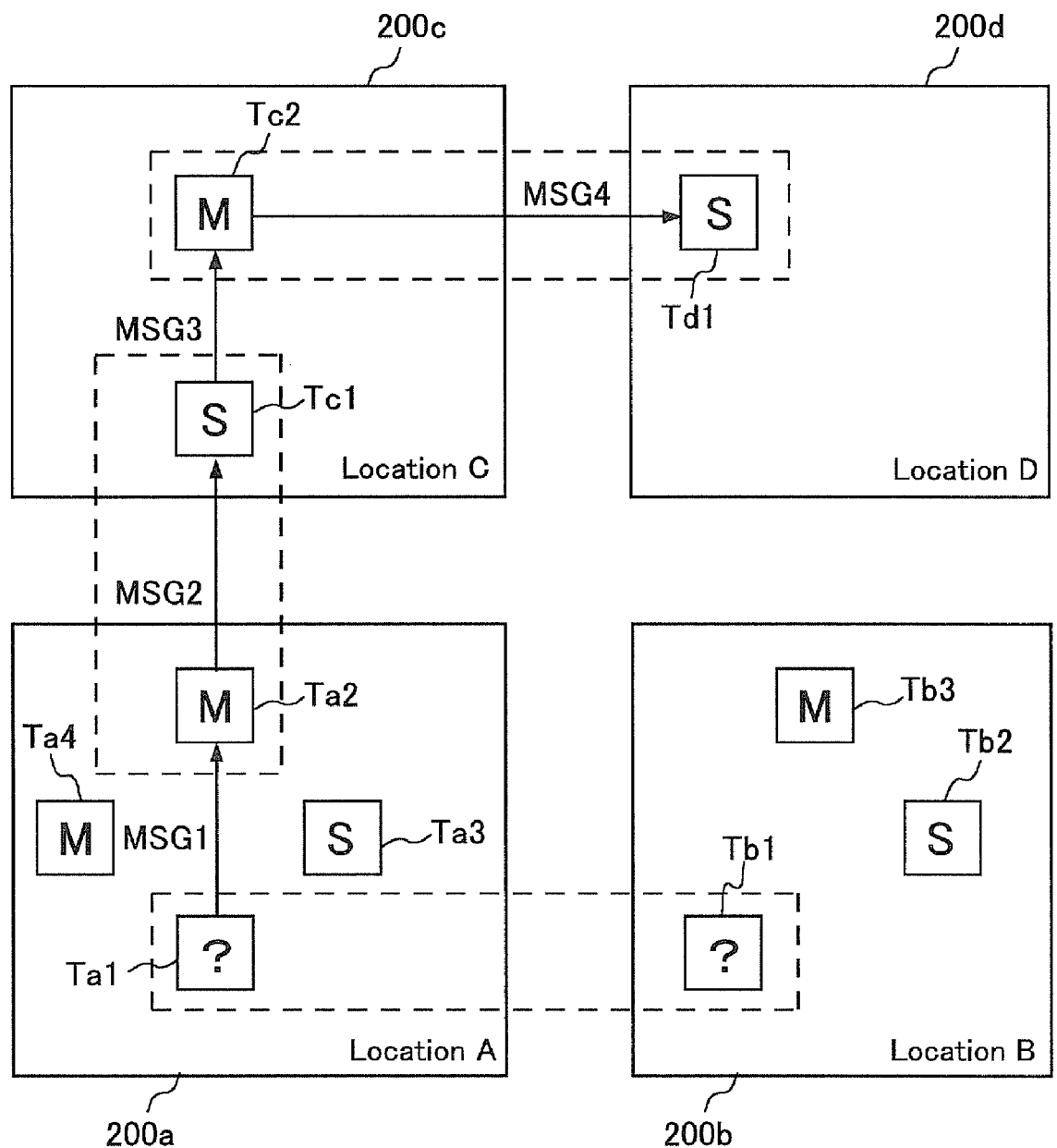
FIG. 10 is a conceptual explanatory diagram showing a schematic structure of a change request message according to Embodiment 2.

FIG. 10 is a conceptual explanatory diagram showing a schematic structure of a role change request message. In order to simplify the explanation, the case will be considered in where the game device Ta1 in the location 200a and the game device Tb1 in the location 200b play the game against each other. In FIG. 10, game devices T surrounded by each dashed line are playing the game against each other. For example, when the master priority Mpa of the game device Ta1 is larger than the master priority Mpb of the game device Tb1 (Mpa>Mpb), the game device Ta1 becomes the master terminal device. It is assumed that the communication band in the location 200a is exceeded when the game device Ta1 becomes the master terminal device. In this case, the game device Ta1 transmits a change request message (MSG in FIG. 10) to the game device Ta2 which is set in the same location 200a and is playing the game against a game device in a different location. When the game device Ta1 transmits a change request message (MSG1) to the game device Ta2, the game device Ta1 starts to play the game as the master terminal device against the opponent Tb1.

On the other hand, the game device Ta2 which has received the change request message MSG1 transfers it to an opponent Tc1 in a different location 200c (MSG2). If the game device Tc1 can change its role, an OK message is transmitted to the game device Ta2. If it can not, the game device Tc1 performs the same process as the game device Ta1. In other words, it transmits a change request message (MSG3) to a game device Tc2 in the same location 200c. The game device Tc2 which has received it transfers it to an opponent Td1 in a different location 200d (MSG4).

The above processes are performed until a game device which returns an OK message is available. However, it is preferable to set a transmission limit in order to prevent an endless continuation of transferring the change request message. For example, a transmission number Ns of the change request message, and an upper transmission limit Nmax are included in the change message. The game device T increments the transmission number Ns every time it transmits the change request message. When it receives the change request message in which Ns is equal to Nmax (Ns=Nmax), it may halt a further transfer of the message.

Figure 11:
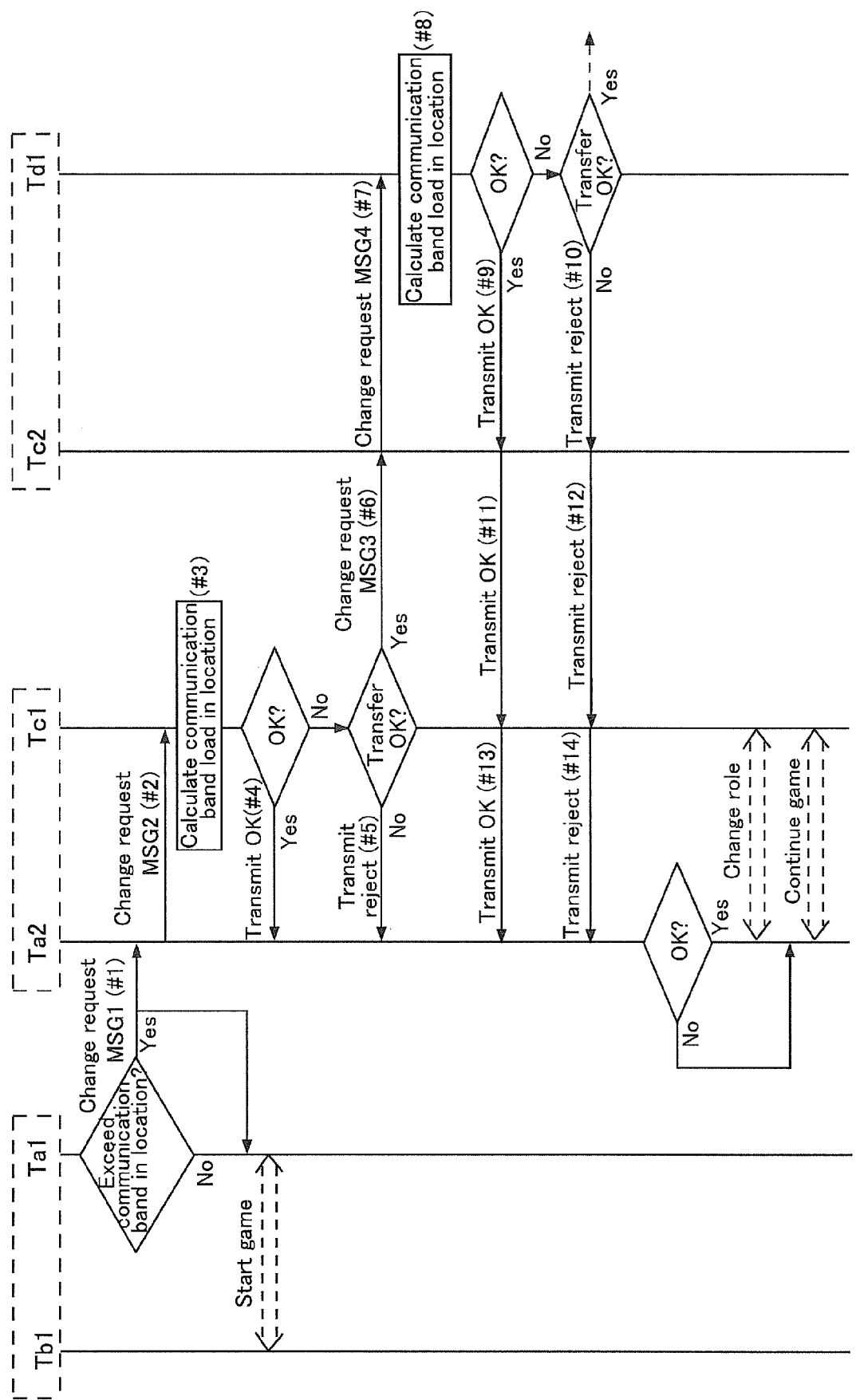
FIG. 11 is an illustrative diagram showing the flow of a transmission process of a change request message to be transmitted between game devices.

FIG. 11 is an illustrative diagram showing an example of the detailed flow of the role change request shown in the above-mentioned FIG. 10.

After the game device Ta1 determines its role based on the master priority, it determines whether or not the communication band in the location is exceeded (second communication band monitoring means). If the communication band is not exceeded, it starts the game against the opponent based on its role which has been determined with no change of its role. If the communication band is exceeded, it transmits the change request message MSG1 to a certain game device Ta2 in the same location 200a (change request transmission means) (#1), and then starts the game against the opponent.

In the message MSG1, the transmission number Ns is equal to "1" (Ns=1), and the upper transmission limit Nmax is a predetermined value, for example, "4". It is preferable if a destination of the message MSG1 is changed according to which of the up band Su or the down band Sd of the communication bands in the location is exceeded. For example, when the up band Su is exceeded, the change request message may be transmitted to a master terminal device in the same location 200a. On the other hand, when the down band Sd is exceeded, the change request message may be transmitted to a slave terminal device in the same location 200a. Which of roles each game device Ta plays can be understood by storing a response to the inquiry about the role which has been transmitted to other game device(s) in the same location 200a (the above-mentioned Step S4) associated with a responder.

On the other hand, when the game device Ta2 receives the change request message MSG1 from the game device Ta1 in the same location 200a, it transfers the message to the opponent Tc1 in the different location 200c (change request message MSG2) (#2). In the message MSG2, the transmission number Ns is equal to "2" (Ns=2), and the upper transmission limit Nmax is equal to "4" (Nmax=4). If the game device Ta2 is the master terminal device, it may transfer the message to a certain opponent. On the contrary, when the game device Ta2 is a slave terminal device, it transmits the message MSG2 to the master terminal device which is its opponent. The game device Ta2 waits for the response to the message MSG2, and determines whether or not to change its role according to the response.

First, the game device Tc1 which has received the message MSG2 calculates the band load of the location 200c when it changes its role (#3), and determines the possibility of changing its role. If the change of its role does not exceed both the up band Su and the down band Sd in the location C, it transmits an OK message indicating that it is possible to change its role to the opponent Ta2 in the location 200a (#4).

On the other hand, if the game device Tc1 determines that it can not change its role because the band in the location is exceeded, it determines the possibility of transferring the change request message. If it is impossible to transfer it, the game device Tc1 transmits a reject message to the game device Ta2 (#5).

On the contrary, when the game device Tc1 determines that it can not change its role, but it can transfer the change message further, it transmits the change request message MSG3 to the game device Tc2 in the same location 200c (#6). In the message MSG3, the transmission number Ns is equal to 3 (Ns=3), and the upper transmission limit Nmax is equal to 4 (Nmax=4).

When the game device Tc2 receives the change request message MSG3 from the game device Tc1 in the same location 200c, it transfers the message to the opponent Td1 in a different location 200d (MSG4) (#7). In the message MSG4, the transmission number Ns is equal to "4" (Ns=4), and the upper transmission limit Nmax is equal to "4" (Nmax=4). The game device Td1 in the location 200d performs the same processes as the above-described game device Tc1 (#8 to #10). As a result, if it is possible to change its role, an OK message is transferred to the game device Ta2 (#9, #11, and #13). On the other hand, when it is impossible neither to change its role nor to transfer the change request message, a reject message is transferred to the game device Ta2 (#10, #12, and #14). In this example, because Ns is equal to Nmas (Ns=Nmas), it is determined that it is not possible to transfer the message.

The game device Ta2 performs processes in accordance with a returned response. In other words, if it receives an OK message, it exchanges its role for that of the opponent and continues the game. When it receives a reject message, it continues the game without changing its role.

It should be noted that it is not necessary to calculate the communication band in a location when a change request message from a game device which is not an opponent in the same location 200a is received. For example, when the game device Ta1 transfers the change request message MSG1 to the game device Ta2, the game device Ta2 may not calculate the band load in the location. This is because even if either of the game device Ta1 or Ta2 is the master terminal device or the slave terminal device, the master terminal device number Nm and the slave terminal device number Ns are the same. In other words, even if either of the game device Ta1 or Ta2 is the master terminal device or the slave terminal device, this does not change the space and the amount of excess of the communication band in the location.

Transmission of Game Data

FIG. 12 shows an example of game data to be transmitted to the next master terminal device when the master terminal device is switched. This example shows the game data of a soccer game. The game data includes the history of the game, and is necessary for continuing the game. A game device T which changes its role from a master terminal device to a slave terminal device in accordance with a change request message transmits the game data to an opponent which will become the new master terminal device. On the contrary, a game device T which changes its role from a slave terminal device to a master terminal device receives the game data from an opponent which has been the master terminal device.

For example, the game data of a soccer game may be the remaining physical strength of the team members, the number of yellow cards and red cards of each team member, the number of shots so far, the number of fouls so far, the points, the name of the teams, team member data, and the like. The game data is transmitted using a communication protocol, TCP/IP or the like, which guarantees the reliability of the communication.

Process Performed by Game Device

The game device T performs the above-mentioned main routine, opponent determination process, master determination process, master process, and slave process as performed in Embodiment 1. However, in addition to the above-mentioned processes, it performs a change request transmission process. The change request transmission process will be described below. Because the process performed by each game device is the same as that in Embodiment 1, the process of the game device Ta1 in FIG. 10 will be described below.

Figure 13:
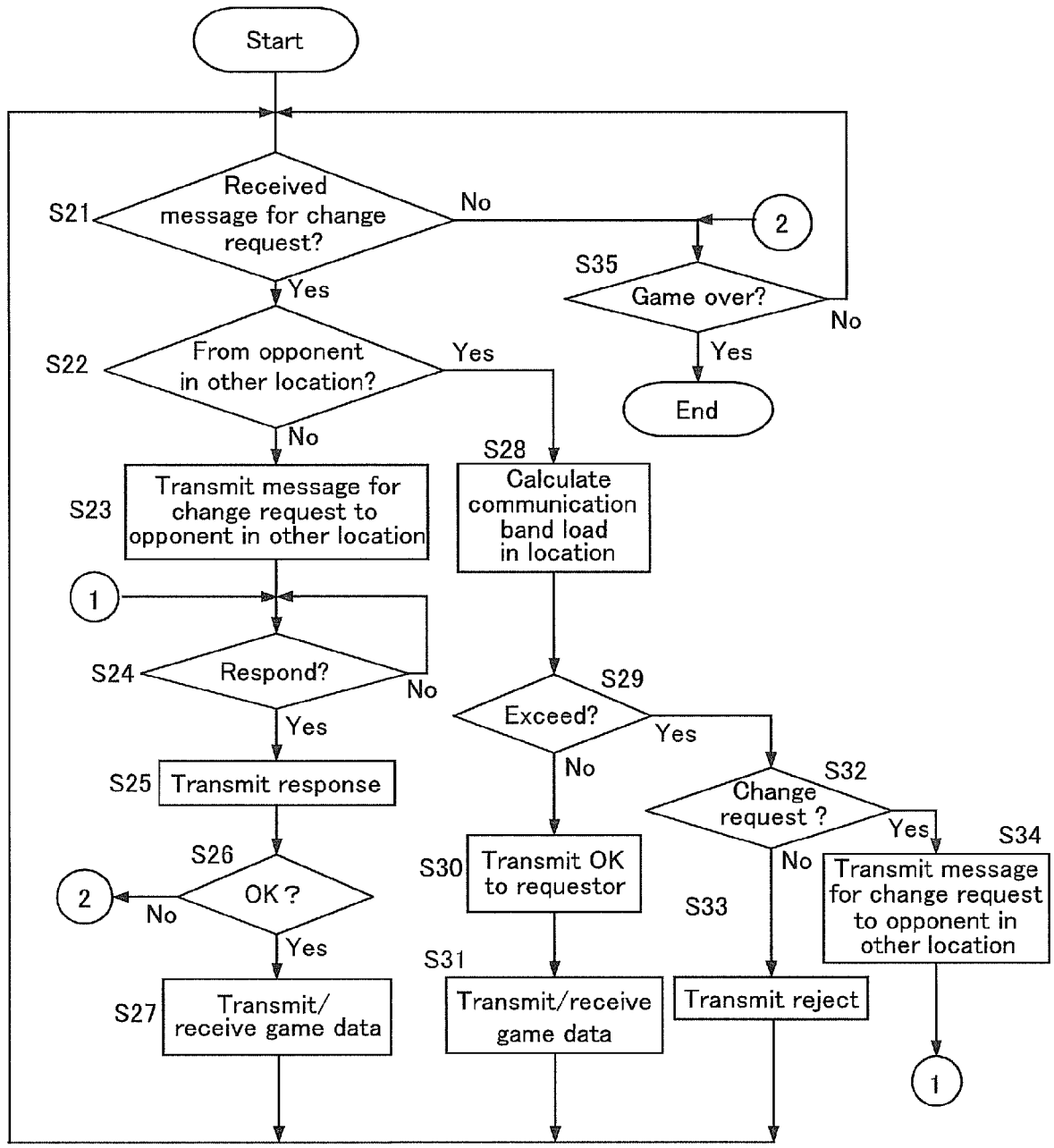
FIG. 13 is a flow diagram showing an example of the flow of a change request transmission process according to Embodiment 2.

FIG. 13 is a flow diagram showing an example of the flow of the change request transmission process performed by the CPU 201. The process is started together with the main routine, and executed irrespective of the main routine. Hereinafter, it will be described specifically in reference to the above-mentioned FIGS. 10 and 11.

Step S21: The CPU 201 waits for reception of the change request message. After it has received the message, it performs the following Steps S22 through S32.

Step S22: The CPU 201 determines if the change request message came from the opponent in a different location 200b, or if it came from a non-opponent in the same location 200a.

Step S23: If the CPU 201 has received the change request message from a non-opponent in the same location 200a, it transmits the change request message to the opponent in a different location 200b. At this time, the CPU 201 increments the transmission number Ns included in the change request message.

Steps S24 and S25: The CPU 201 waits for a response from the opponent in different location 200b (S24). When it receives the response, it transmits the change request message received at the above-mentioned Step S21 to the requester (S25).

Steps S26 and S27: When the CPU 201 receives an OK message as the response (S26), it exchanges its role for that of the opponent, and transmits and receives game data to and from the opponent (S27). When it receives a reject message as the response (S26), it waits for the reception of the next change request message without changing its role.

Step S28: If the CPU 201 receives the change request message from the opponent in the different location 200b, it calculates the communication band load in the location based on the status of the location for the case where it changes its role. It is preferable if it asks other game device(s) in the same location 200a about each role before calculating the communication band load.

Step S29: The CPU 201 determines whether or not the change of its role causes the communication band in the location to be exceeded.

Steps S30 and S31: When the communication band in the location is not exceeded, the CPU 201 transmits an OK message to the requester of the received change request message (S30). Then, it exchanges its role for that of the opponent, and transmits and receives game data to and from the opponent (S31).

Steps S32 and S33: When the communication band in the location is exceeded (S32), the CPU 201 transmits a reject message to the requester of the received change request message (S33). The CPU 201 transfers a change request message to a non-opponent in the same location 200a if possible (S34). When the up band Su in the location is exceeded, it is preferable to transfer the message to a game device being a master terminal device. On the other hand, when the down band Sd is exceeded, it is preferable to transfer the message to a game device being a slave terminal device. Then, it performs the above-described Steps S24 through S27.

The role of the game device is changed flexibly based on the change request, and this makes it easier to prevent the communication band in the location from being exceeded. It can be expected that an effective use of the communication band will be promoted over the entire game system in which a plurality of locations are connected via the external network.

Embodiment 3

Figure 14:
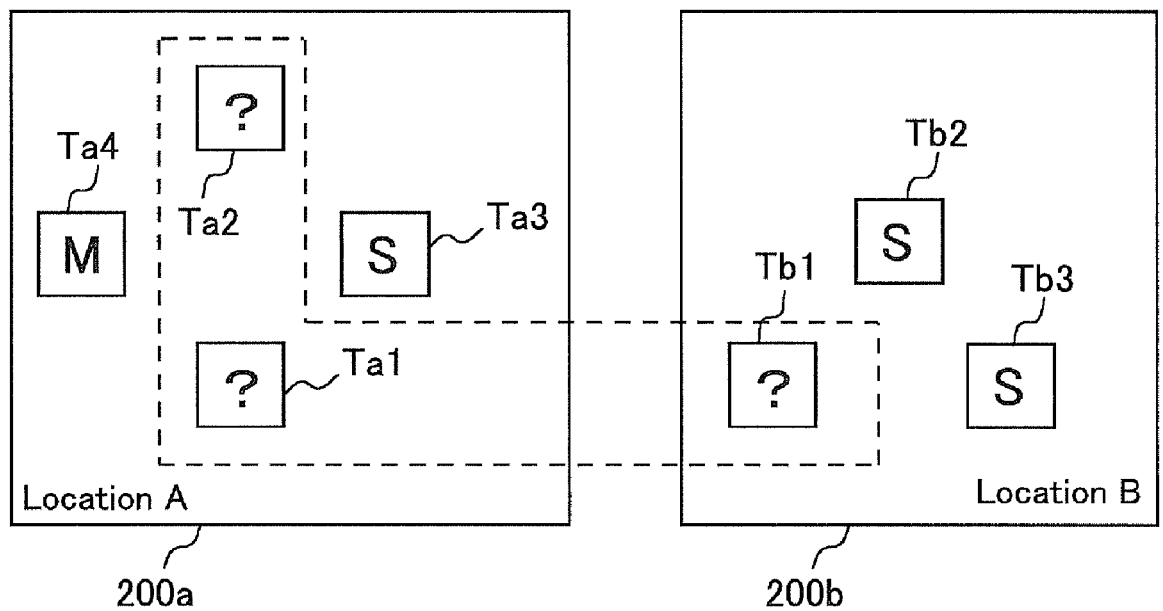
FIG. 14 shows an example of a game status according to Embodiment 3.

In the first and second embodiments, the present invention was described by using an online game played one-to-one as an example. However, an online game played with three or more game devices T is also included in the present invention. The case where the game device has an opponent(s) in the same location is also included in the present invention. When three or more game devices T which are set in different locations from one another play the online game, the same processes may be performed as those of the first and the second embodiments, except for the process for comparing three or more master priorities. Therefore, an example will be described in which the game device has at least an opponent in the same location. In order to simplify the description, a case will be considered in which the game devices Ta1 and Ta2 in the location 200a, and the game device Tb1 in the location 200b, play the game against one another as shown in FIG. 14. In FIG. 14, the game devices surrounded with the dashed line play the game against one another.

When the game device T in the present embodiment has an opponent in the same location, a master candidate which may become the master terminal device is determined from the game device itself or the opponent. In the same location, it makes no difference which of them will become the master terminal device. The master candidate is determined based on the communication address, such as an IP address (master candidate determination data) for example. The communication address of the opponent which has been obtained in the above-mentioned opponent determination process can be used (in FIG. 5). When the game device itself is the master candidate, it exchanges its master priority for that of the opponent in a different location, and the master terminal device is determined. Then, it performs either the master process or the slave process according to whether or not it becomes the master terminal device. When it is not the master candidate, it waits for a notification of the master terminal device which will be sent from the master candidate, and then performs the slave process.

In addition, when an opponent exists in the same location, the game device that is the master candidate will include the opponent in the number of slave terminal devices in order to calculate the master priority Mp. For example, in FIG. 14, when the game device Ta1 is the master candidate, it calculates the master priority Mpa by counting the master terminal device number Nm as "1" (Nm=1), and the slave terminal device number Ns as "2" (Ns=2).

The master candidate can be also determined based on other data (master candidate determination data) in place of the communication address. For example, a game terminal device operated by a player having the lowest master experience value E may be determined to be the master candidate. In this case, it is necessary for game devices which play the game in the same location to transmit and receive their master experience values E to each other. The exchange of the master experience values E will be performed after the opponent determination process and before calculation of a master priority.

Main Routine

Figure 15:
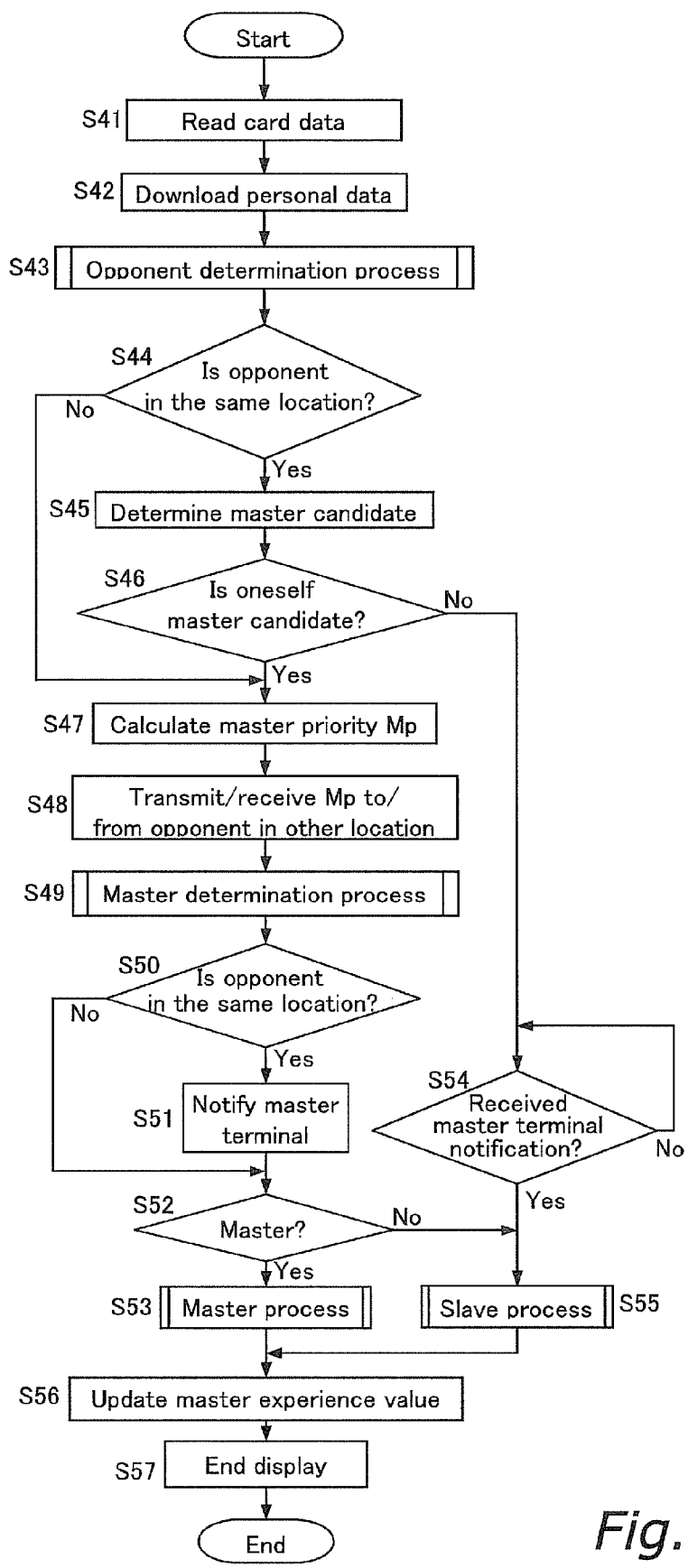
FIG. 15 is a flow diagram showing an example of the flow of the main routine performed by a game device according to Embodiment 3.

FIG. 15 is a flow diagram showing an example of the flow of the main routine performed by the CPU 201 of the game device T. In order to simplify the explanation, the master candidate is determined based on the value of an IP address.

Step S41: The CPU 201 obtains a player ID which is read by the card reader/writer 212.

Step S42: The CPU 201 transmits the player ID to the center server 100, and downloads personal data in accordance with the player ID. In this process, it is preferable to request a player to enter a password and verify the identity of the player based on the password.

Step S43: The CPU 201 performs the opponent determination process which has been described above, and obtains the IP addresses of the game devices Ta2 and Tb1, which are the opponents it will play against via the network 300.

Step S44: The CPU 201 determines whether or not it has an opponent in the same location 200a based on the IP address of the opponent (co-location opponent judgment means).

Step S45: When the CPU 201 has an opponent in the same location 200a, it determines one of them to be the master candidate (candidate determination means). For example, an opponent with a larger IP address can be determined to be the master candidate.

Step S46: The CPU 201 determines whether or not the game device Ta1 itself is the master candidate. If it is (if its IP address is larger), it proceeds to Step S47. If it is not (if its IP address is smaller), it proceeds to Step S54 which will be described later.

Step S47: The CPU 201 calculates the master priority Mpa of the game device Ta1 itself. The method of calculation which was described in the example in Embodiment 1 can be used. Before calculating the master priority Mpa, the CPU 201 transmits an inquiry about roles to the game devices in the same location 200a. The CPU 201 calculates the present master terminal device number Nm and the present slave terminal device number Ns. At this time, the opponent Ta2 in the same location 200a is counted in the slave terminal device number Ns.

Step S48: The CPU 201 transmits the master priority Mpa of the game device Ta1 itself to the opponent Tb1 in the different location 200b. In addition, it receives the master priority Mpb of the opponent Tb1.

Step S49: The CPU 201 determines which of the game devices is to be the master terminal device, and which of the game devices are to be slave terminal devices, according to the master determination process previously described (in FIG. 6).

Steps S50 and S51: When the CPU 201 has an opponent in the same location (S50), it notifies the opponent of the IP address of the master terminal device (S51). The notification of the master terminal device may be performed in the master process previously described (in FIG. 7).

Step S52: The CPU 201 determines whether or not the game device itself will become the master terminal device in the game which is to being played, based on the result of the master determination process. When the game device itself is not the master terminal device, it proceeds to Step S55, which will be described later, and starts the game as a slave terminal device.

Step S53: When the game device itself becomes the master terminal device, the CPU 201 performs the above-described master process to execute the game as the master terminal device. When the game is finished, it notifies slave terminal devices of a game end notification.

Step S54: When the CPU 201 determines that the game device itself is not the master candidate (its IP address is smaller), it waits for notification of the IP address of the master terminal device from the opponent in the same location 200a, recognizes the notified IP address as the master terminal device, and performs the slave process.

Step S55: The CPU 201 executes the game with the previously described slave process. In other words, it transmits the input data indicating a player's commands to the master terminal device, and controls output based on output data which is received from the master terminal device until the game is finished.

Step S56 The CPU 201 updates the master experience value E of the player.

Step S57: The CPU 201 displays the game outcome, uploads the personal data to the center server 100, and the like, when the game is finished.

Irrespective of the main routine, when the CPU 201 receives the inquiry about its role from the game device T in the same location 200a during game execution, it performs a response process in which the game device informs the game device T of its role as performed in Embodiment 1 (not shown).

In addition, when the master priority Mp is calculated based on the communication band in the location 200, the CPU 201 stores in the ROM 203 and the like the up band and the down band used by a master terminal device and a slave terminal device respectively, and communication bands Su and Sd in the location 200, as it does in Embodiment 1.

Illustrative Example of the Flow of the Process Shown in FIG. 15

The flow of processes performed by the game devices Ta1 and Ta2 in the location 200a, and the game device Tb1 in the location 200b, which play the game against one another will be described in detail.

(1) Game Device Ta1

After the opponent determination process (S43), the game device Ta1 compares the IP address of the game device Ta1 with that of the game device Ta2. When the IP address of the game device Ta1 is larger, the game device Ta1 determines that it is the master candidate (S45). When the game device Ta1 itself is the master terminal device (S46), it calculates the master priority Mpa of the first location and transmits it to the game device Tb1 (S47 and S48). In addition, it receives the master priority Mpb of the second location from the game device Tb1 (S48). The game device Ta1 compares the master priority Mpa with the master priority Mpb to determine which of the game device Ta1 itself or the game device Tb1 becomes the master terminal device (S49). To simplify the description, it is assumed that Mpa is larger than Mpb (Mpa>MPb), and the game device Ta1 itself has been determined to be the master terminal device.

The game device Ta1 notifies the game device Ta2, which is an opponent in the same location 200a, of the IP address of the game device to be the master terminal device (S51). In this case, it provides the IP address of the game device Ta1 as the master terminal device. Further, the game device Ta1 performs the master process when it becomes the master terminal device (S52 and S53).

(2) Game Device Ta2

After the opponent determination process (S43), the game device Ta2 compares its IP address with that of the game device Ta1. It determines that the game device Ta1 is the master candidate because the IP address of the game device Ta2 is smaller, and that the game device Ta2 itself is a slave terminal device (S45). The game device Ta2 waits for a notification of the master terminal device from the game device Ta1, which is the opponent in the same location 200a (S54). Then, the game device Ta2 performs the slave process (S55).

(3) Game Device Tb1

After the determination of opponents (S43), the game device Tb1 calculates the master priority Mpb of the second location and transmits it to the game device Ta1 (S47 and S48). In addition, it receives the master priority Mpa of the first location from the game device Ta1 (S48). The game device Tb1 compares the master priority Mpa with the master priority Mpb, and determines which of the game device Ta1 or the game device Tb1 itself becomes the master terminal device (S49). As described above, it is assumed that Mpa is larger than Mpb (Mpa>Mpb), and the game device Ta1 has been determined to become the master terminal device. The game device Tb1 determines whether or not it is the master terminal device, and because it is a slave terminal device, it performs the slave process (S52 and S55).

Even if the game device has an opponent(s) in the same location which it plays the game against, the master terminal device can be determined by using the master priority as performed above.

Other Embodiments (A) The above-described embodiments can be carried out in combination as appropriate. In addition, the method for calculating the master priority Mp is not limited to the above-mentioned examples.

(B) In the above-described master determination process (in FIG. 6), the master terminal device is determined according to value of their IP addresses when the value of the master priorities of players playing the game are the same. However, it may be considered that their master priorities are competing when the difference between them is below a predetermined value, as well as when their master priorities are the same. Further, when their master priorities are competing, the master terminal device may be determined based on another identifier which identifies each game device in place of the IP address. For example, a unique device number of each device can be cited as the identifier.

In addition, even if the identifier does not identify a game device but a location, the master terminal device can be determined as follows. By determining any location to which the master terminal device is assigned based on the value of an identifier, the alphabetical order, or the like, a game device which exists in the location may be determined to be the master terminal device.

(C) The present invention includes programs for carrying out the above-described methods on computers and computer readable recording media on which such programs are recorded. The recording media may include computer readable/writable flexible discs, hard discs, semiconductor memories, CD-ROMs, DVDs, magneto-optical discs (MO), and the like.

INDUSTRIAL APPLICABILITY

The present invention can be applied to an online game.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A game device comprising:
    an input/output control unit configured to receive operation commands inputted by at least one player;
    a network communication unit connected to a first internal network at a first location and an external network such that the game device receives a communication address of at least one other game device connected to a second internal network at a second location via the network communication unit and the external network, the game device being configured to designate the communication address of the at least one other game device as a communication address of an opponent, and execute an online game;
    a calculation unit configured to calculate a first master priority Mp1 based on a status of the first location, the status of the first location including a communication band of a communication line at the first location connecting the network communication unit to the external network, and a ratio of master terminal devices to slave terminal devices at the first location, the first master priority Mp1 representing a priority for determining which game device is to be designated as a master terminal device that manages the progress of the online game, the game device being designate-able as a master terminal device or a slave terminal device;
    a transmission unit configured to transmit the first master priority Mp1 to the opponent via the external network to the at least one other game device;
    a receiving unit configured to receive via the external network a second master priority Mp2 that represents a priority of the at least one other game device for determining which game device is to be designated as a master terminal device, where the second master priority Mp2 is calculated by the at least one other game device based on a status at the second location including a communication band of a communication line at the second location connecting the at least one other game device to the external network, and a ratio of master terminal devices to slave terminal devices at the second location; and
    a determination unit configured to compare the first master priority Mp1 with the second master priority Mp2, and determine which of the game device and the at least one other game device will be designated the master terminal device or the slave terminal device based on the comparison result, which includes at least one of: comparing status of the communication band at the first location with status of the communication band at the second location; and comparing the ratio of master terminal devices to slave terminal devices at the first location with the ratio of master terminal devices to slave terminal devices at the second location of the at least one other name device.

2. The game device according to claim 1, further comprising:
    a determined result transmission unit configured to transmit the results determined by the determination unit, and
    a determined result receiving unit configured to receive the determination result on whether to become a master terminal device or a slave terminal device from the at least one other game device, wherein the calculation unit calculates the first master priority Mp 1 based on the number of master terminal devices and the number of slave terminal devices at the first location, when the determined result receiving unit receives the determination result transmitted from the at least one other game device.

3. The game device according to claim 1, wherein the calculation unit calculates the first master priority Mp1 based on the reception communication band and transmission communication band of a communication line connected between the first internal network at the first location and the external network.

4. The game device according to claim 1, further comprising a first experience value storage unit configured to store a game experience value of a player based on the number of times the player has played the online game on a master terminal device and the number of times the player has played the online game on a slave terminal device, and a first update unit configured to update the game experience value, wherein
    the calculation unit calculates the first master priority Mp1 based on the game experience value stored in the first experience value storage unit in addition to the status of the location, and
    the first update unit updates the game experience value by adding a predetermined value to the game experience value in accordance with the determination of the determination unit.

5. The game device according to claim 1, further comprising a second experience values storage unit configured to store a game number, which is the number of times the player has played the online game, and a master time, which is the number of times the player has played the online game at a master terminal device, and a second update unit configured to update the game number and the master number, wherein
    the calculation unit calculates the first master priority Mp 1 based on the status of the location in addition to a ratio of the master number to the game number, and
    the second update unit updates the game number by increasing the game number, and updates the master number by increasing the master number, in accordance with the determination of the determination unit.

6. The game device according to claim 1, comprising:
    a first communication band monitoring unit configured to determine whether or not to exceed the communication band of the first location connected to the external network when becoming a master terminal device or a slave terminal device, turn on a master ban flag when the communication band is exceeded when the game devices becomes a master terminal device, and turn on a slave ban flag when the communication band is exceeded when the game device becomes a slave terminal device, and;

a flag transmission unit configured to transmit the flag set by the first communication band monitoring unit; and a flag receiving unit configured to receive a flag transmitted from the other game device via the external network; wherein the determination unit determines which game device will become a master terminal device or a slave terminal device based on the flag set by the first communication band monitoring unit and the flag received by the flag receiving unit, in response to a comparison of the first master priority Mp1 with the second master priority Mp2.

7. The game device according to claim 1, further comprising:

a second communication band monitoring unit configured to determine whether or not the determination of the determination unit will lead to the communication band of the first location connected to the external network being exceeded, and a change request transmission unit configured to transmit a change request message when the communication band of the first location is to be exceeded and when a plurality of game devices are connected to the first internal network, the change request message requesting at least one of the plurality of game devices at the first location to change from a master terminal device to a slave terminal device, or change from a slave terminal device to a master terminal device, via the first internal network.

8. The game device according to claim 1, wherein the determination unit determines which game device will become a master terminal device or a slave terminal device, when the first master priority Mp1 and the second master priority Mp2 compete against each other, based on an identifier which identifies each game device over the first internal network and the second internal network.

9. The game device according to claim 1, further comprising:

a opponent determination configured to determine whether or not any remaining game device at the first location is included as an opponent in addition to the game device at the second location, and a candidate determination unit configured to determine, when an opponent plays the game at the first location, which game device will become a candidate for a master terminal device or a candidate for a slave terminal device at the first location, based on predetermined master candidate determination data, wherein when the game device becomes a master candidate, the game device will determine whether it will become a master terminal device or a slave terminal device.

* * * * *